United States Patent
Kim et al.

(10) Patent No.: US 10,602,141 B2
(45) Date of Patent: Mar. 24, 2020

(54) FILTERING METHOD AND APPARATUS FOR IMPROVING PREDICTION IN IMAGE CODING SYSTEM

(71) Applicant: LG ELECTRONICS INC., Seoul (KR)

(72) Inventors: Kyuwoon Kim, Seoul (KR); Jaehyun Lim, Seoul (KR); Naeri Park, Seoul (KR); Jungdong Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/768,403

(22) PCT Filed: Jan. 25, 2016

(86) PCT No.: PCT/KR2016/000788
§ 371 (c)(1),
(2) Date: Apr. 13, 2018

(87) PCT Pub. No.: WO2017/065357
PCT Pub. Date: Apr. 20, 2017

(65) Prior Publication Data
US 2018/0309987 A1    Oct. 25, 2018

Related U.S. Application Data

(60) Provisional application No. 62/242,309, filed on Oct. 16, 2015, provisional application No. 62/242,308, filed on Oct. 16, 2015.

(51) Int. Cl.
*H04N 19/117*  (2014.01)
*H04N 19/105*  (2014.01)
(Continued)

(52) U.S. Cl.
CPC ......... *H04N 19/117* (2014.11); *H04N 19/105* (2014.11); *H04N 19/176* (2014.11);
(Continued)

(58) Field of Classification Search
CPC .. H04N 19/105; H04N 19/503; H04N 19/513; H04N 19/82; H04N 19/176; H04N 19/117
See application file for complete search history.

(56) References Cited

U.S. PATENT DOCUMENTS

2009/0129465 A1*  5/2009  Lai ..................... H04N 19/597
                                                 375/240.02
2010/0254448 A1   10/2010  Xu et al.
(Continued)

FOREIGN PATENT DOCUMENTS

KR    10-2011-0066888 A    6/2011
KR    10-2011-0093811 A    8/2011
KR    10-2013-0124539 A    11/2013

OTHER PUBLICATIONS

Yongfei Zhang et al., "Spatial Correlation and Texture-Based Fast Adaptive Loop Filter for HEVC", Wireless Communications & Signal Processing (WCSP), 2012 International Conference on, IEEE, Oct. 25, 2012, pp. 1-5, XP03248446.
(Continued)

*Primary Examiner* — Neil R Mikeska
(74) *Attorney, Agent, or Firm* — Dentons US LLP

(57) ABSTRACT

An inter prediction method according to the present invention, which is performed by a decoding apparatus, comprises the steps of: acquiring prediction-related information and residual information from a received bitstream; performing inter prediction on a current block on the basis of the prediction-related information so as to generate prediction samples; generating a list of Wiener filter candidates on the basis of spatially neighboring blocks of the current block,
(Continued)

and deriving Wiener filter coefficients for the current block on the basis of candidate blocks in the list of the Wiener filter candidates; filtering the prediction samples on the basis of the derived Wiener filter coefficients; deriving residual samples for the current block on the basis of the residual information; and generating a reconstructed picture on the basis of the filtered prediction samples and the residual samples. The present invention can reduce the amount of data for a residual signal and improve coding efficiency.

15 Claims, 15 Drawing Sheets

(51) Int. Cl.
*H04N 19/503* (2014.01)
*H04N 19/82* (2014.01)
*H04N 19/176* (2014.01)
*H04N 19/513* (2014.01)

(52) U.S. Cl.
CPC ......... *H04N 19/503* (2014.11); *H04N 19/513* (2014.11); *H04N 19/82* (2014.11)

(56) References Cited

U.S. PATENT DOCUMENTS

| | | | | |
|---|---|---|---|---|
| 2011/0222608 A1* | 9/2011 | Gao | ..................... | H04N 19/176 375/240.24 |
| 2011/0228843 A1* | 9/2011 | Narroschke | ............ | H04N 19/46 375/240.03 |
| 2012/0082217 A1* | 4/2012 | Haskell | ................ | H04N 19/176 375/240.12 |
| 2012/0155533 A1* | 6/2012 | Puri | ..................... | H04N 19/176 375/240.02 |
| 2012/0300849 A1* | 11/2012 | Yasugi | .................. | H04N 19/61 375/240.16 |
| 2012/0307898 A1 | 12/2012 | Chono et al. | | |
| 2012/0320973 A1* | 12/2012 | Xu | .......................... | H04N 19/46 375/240.03 |
| 2013/0287312 A1* | 10/2013 | Minezawa | ................ | G06T 5/20 382/233 |
| 2014/0328414 A1* | 11/2014 | Puri | ..................... | H04N 19/176 375/240.29 |
| 2015/0288964 A1* | 10/2015 | Puri | ..................... | H04N 19/124 375/240.03 |
| 2019/0028703 A1* | 1/2019 | Tamse | .................. | H04N 19/176 |
| 2019/0110045 A1* | 4/2019 | Zhao | ................... | H04N 19/167 |

OTHER PUBLICATIONS

Zhang, K. et al., "Single-Pass Encoding Using Multiple Adaptive Interpolation Filters", 37. VCEG Meeting, ITU-Telecommunications Standardization Sector, Study Group 16 Question 6, Video Coding Experts Group (VCEG), Apr. 11, 2009, VCEG-AK26, XP030003678.

Chia-Yang Tsai et al., "Adaptive Loop Filtering for Video Coding", IEEE Journal of Selected Topics in Signal Processing, vol. 7, No. 6, Dec. 1, 2013, pp. 934-945, XP055265962.

Xinfeng Zhang et al., "Adaptive Loop Filter with Temporal Prediction", 2012 Picture Coding Symposium, (PCS 2012), May 7, 2012, pp. 437-440, XP032449919.

* cited by examiner

FIG. 9
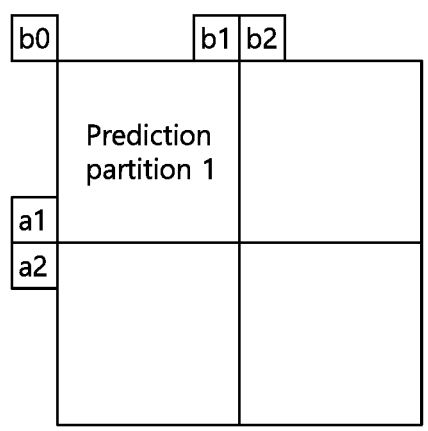
(a)
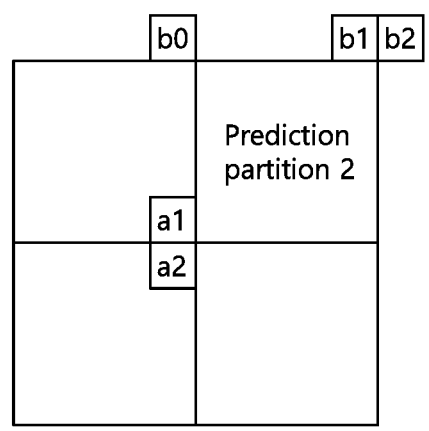
(b)
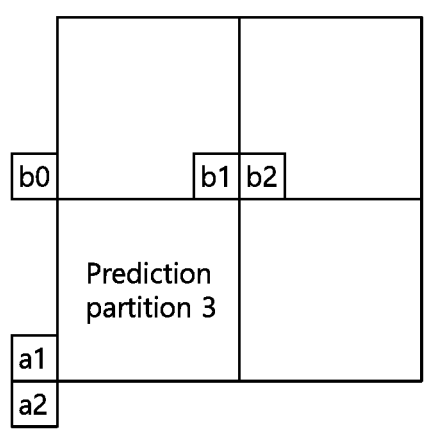
(c)
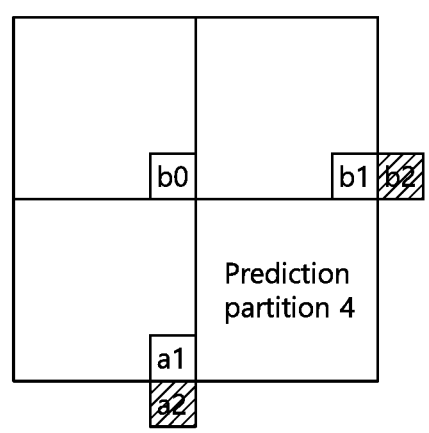
(d)

FIG. 12

|     | int | 1/4 | 1/2 | 3/4 |
|-----|-----|-----|-----|-----|
| int | ▨   |     |     |     |
| 1/4 |     |     |     |     |
| 1/2 |     |     |     |     |
| 3/4 |     |     |     |     |

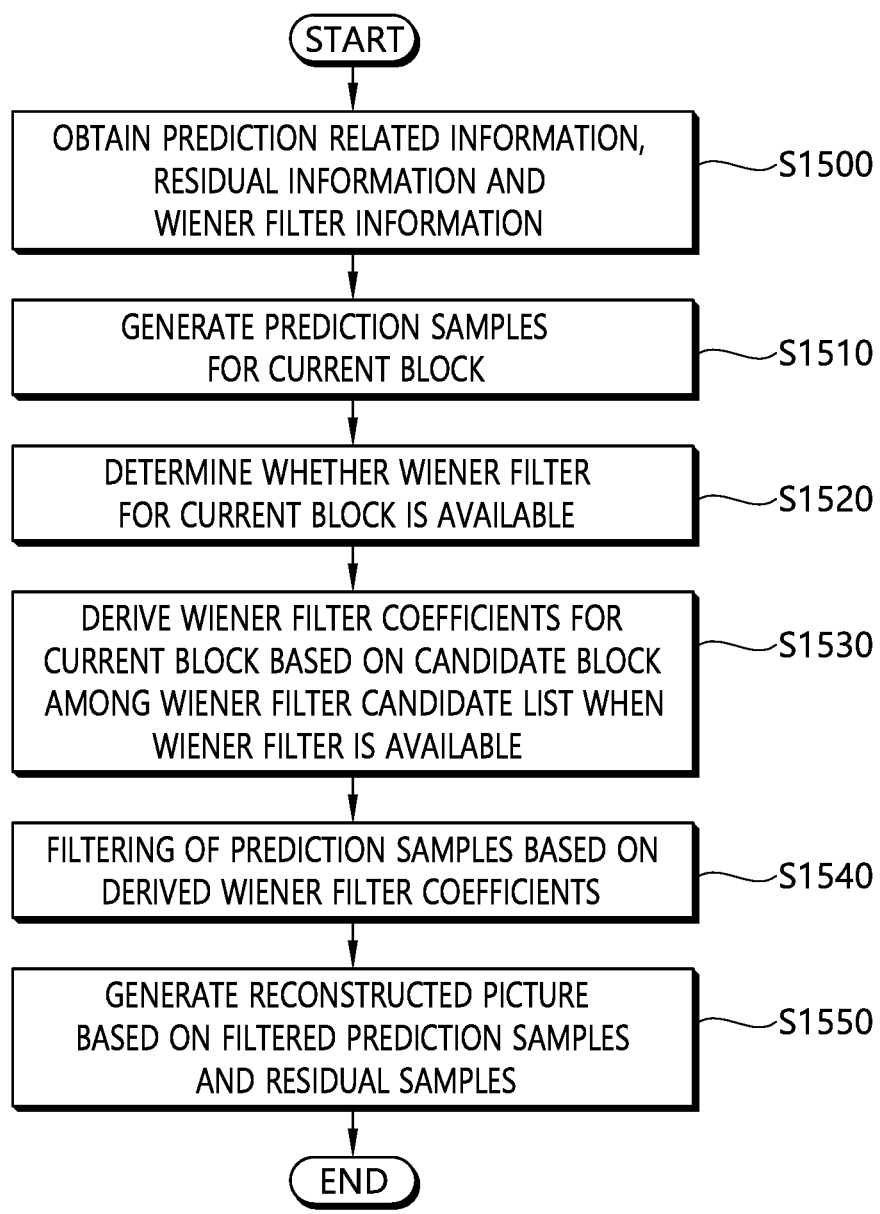

FILTERING METHOD AND APPARATUS FOR IMPROVING PREDICTION IN IMAGE CODING SYSTEM

CROSS-REFERENCE TO RELATED APPLICATIONS

This application is the National Stage filing under 35 U.S.C. 371 of International Application No. PCT/KR2016/000788, filed on Jan. 25, 2016, which claims the benefit of U.S. Provisional Applications No. 62/242,309 filed on Oct. 16, 2015, and No. 62/242,308 filed on Oct. 16, 2015, the contents of which are all hereby incorporated by reference herein in their entirety.

BACKGROUND OF THE INVENTION

Field of the Invention

The present invention relates to an image coding technique, more particularly, to a filtering method and apparatus for improving prediction in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

An object of the present invention is to provide a method and apparatus for improving an image coding efficiency.

Another object of the present invention is to provide a method and apparatus for improving performance of prediction.

Still another object of the present invention is to provide a method and apparatus for improving performance of inter-prediction.

Still another object of the present invention is to provide a method and apparatus for improving performance of prediction by applying a Wiener filter to prediction samples.

Still another object of the present invention is to provide a method and apparatus for applying filtering to prediction samples efficiently with decreasing additional information for a Wiener filter.

According to an embodiment of the present invention, an image decoding method is provided, which is performed by a decoding apparatus. The method includes obtaining prediction related information and residual information from a received bit stream, generating prediction samples by performing an inter-prediction based on the prediction related information for a current block, determining whether a Wiener filter is available for the current block, generating a Wiener filter candidate list based on spatial neighboring blocks of the current block when the Wiener filter is available, and deriving Wiener filter coefficients for the current block based on a candidate block in the Wiener filter candidate list, filtering the prediction samples based on the derived Wiener filter coefficients, deriving residual samples for the current block based on the residual information, and generating a reconstructed picture based on the filtered prediction samples and the residual samples.

According to another embodiment of the present invention, a decoding apparatus performing image decoding is provided. The decoding apparatus includes a decoding unit obtaining prediction related information and residual information from a received bit stream, a prediction unit for generating prediction samples by performing an inter-prediction based on the prediction related information for a current block, determining whether a Wiener filter is available for the current block, generating a Wiener filter candidate list based on spatial neighboring blocks of the current block when the Wiener filter is available, and deriving Wiener filter coefficients for the current block based on a candidate block in the Wiener filter candidate list, filtering the prediction samples based on the derived Wiener filter coefficients, an inverse transform unit for generating residual samples for the current block based on the residual information, and an adder for generating a reconstructed picture based on the filtered prediction samples and the residual samples.

According to an embodiment of the present invention, an image encoding method is provided, which is performed by an encoding apparatus. The method includes generating prediction samples for a current block based on an inter-prediction, determining whether a Wiener filter is available for the current block, generating a Wiener filter candidate list based on spatial neighboring blocks of the current block when the Wiener filter is available, and deriving Wiener filter coefficients for the current block based on a candidate block in the Wiener filter candidate list, filtering the prediction samples based on the derived Wiener filter coefficients, deriving residual samples for the current block based on original samples and the filtered prediction samples, and outputting by encoding prediction related information of the current block, residual information of the residual samples and Wiener filter information.

According to another embodiment of the present invention, an encoding apparatus performing image encoding is provided. The encoding apparatus includes a prediction unit for generating prediction samples for a current block based on an inter-prediction, determining whether a Wiener filter is available for the current block, generating a Wiener filter candidate list based on spatial neighboring blocks of the current block when the Wiener filter is available, and deriving Wiener filter coefficients for the current block based on a candidate block in the Wiener filter candidate list, filtering the prediction samples based on the derived Wiener filter coefficients, a deducting unit for deriving residual samples for the current block based on original samples and the filtered prediction samples, and an encoding unit for outputting by encoding prediction related information of the current block, residual information of the residual samples and Wiener filter information.

According to the present invention, Wiener filter coefficients for a current block may be efficiently derived with using little additional information. In addition, according to the present invention, prediction efficiency may be improved through filtering for prediction samples based on Wiener filter coefficients, and amount of data for residual signal transmission may be reduced, thereby increasing overall coding efficiency.

BRIEF DESCRIPTION OF THE DRAWINGS

FIG. 9 shows an example of neighboring blocks that may be considered for deriving Wiener filter coefficients for each prediction block in the case that the partitioning mode is N×N.

FIG. 12 illustrates an example of a motion vector phase according to the present invention.

FIG. 15 illustrates an example of an image decoding method according to the present invention schematically.

DESCRIPTION OF EXEMPLARY EMBODIMENTS

Figure 1:
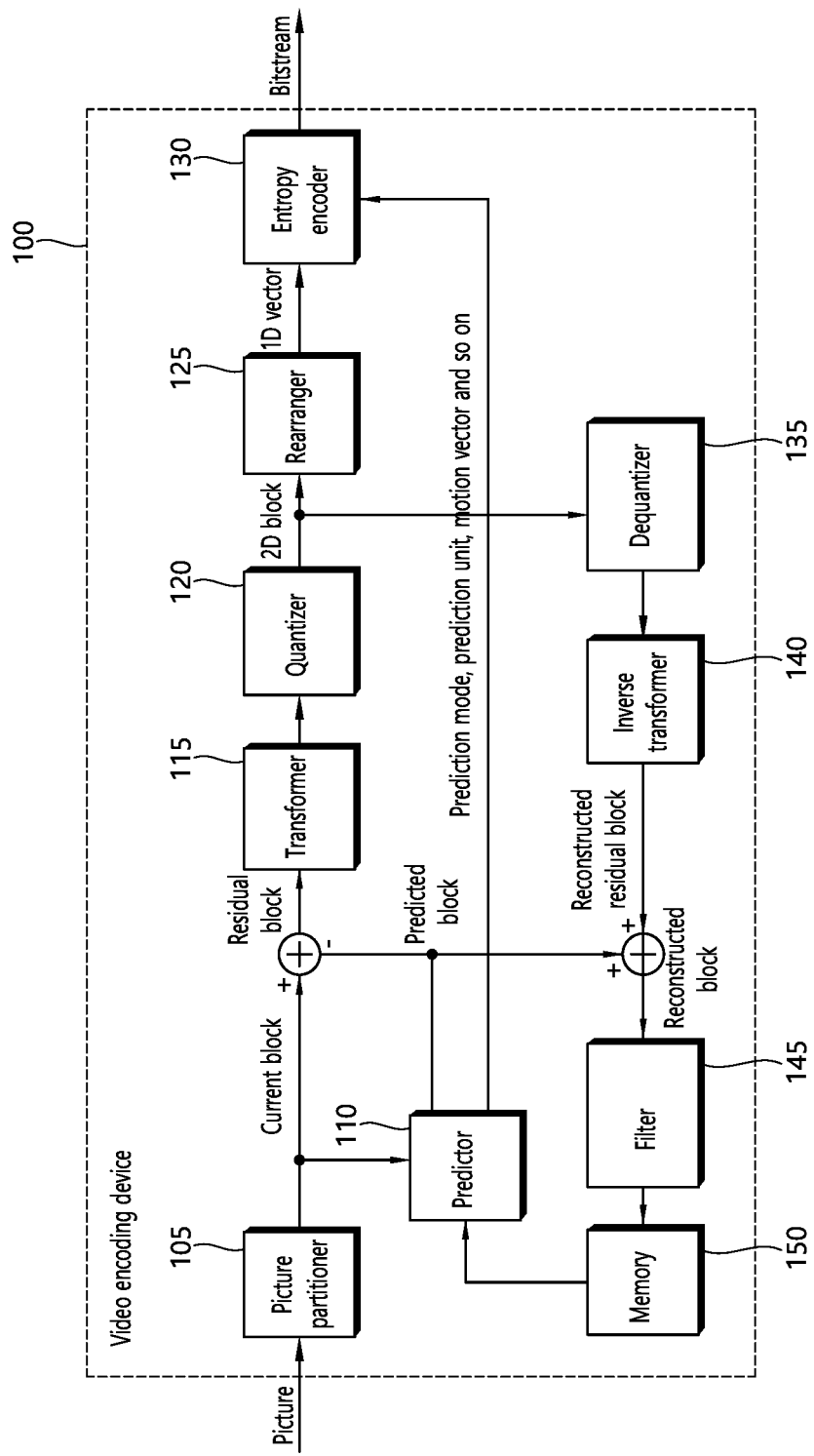
FIG. 1 is a block diagram schematically illustrating a video encoding apparatus according to an embodiment of the present invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 115, a quantizer 120, a rearranger 125, an entropy encoder 130, a dequantizer 135, an inverse transformer 140, a filter 145, and memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Also, the TU may be split into a quad tree structure from the CU.

The predictor 110 includes an inter prediction unit that performs an inter prediction process and an intra prediction unit that performs an intra prediction process, as will be described later. The predictor 110 performs a prediction process on the processing units of a picture divided by the picture dividing module 105 to create a prediction block including a prediction samples or a prediction samples array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter prediction method, a skip mode, a merge mode, and Advanced Motion Vector Prediction (AMVP) may be used. In inter prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized. Pixels and pels are used interchangeably each other herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample according to the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoding device.

The transformer 115 performs a transform process on the residual block in the unit of TUs and generates transform coefficients.

A transform block is a rectangular block of samples and is a block to which the same transform is applied. The transform block may be a TU and may have a quad-tree structure.

The transformer 115 may perform a transform process according to the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the rearranger 125.

The rearranger 125 may rearrange the transform coefficients supplied from the quantizer 120. By rearranging the quantization coefficients, it is possible to enhance the encoding efficiency in the entropy encoder 130.

The rearranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the rearranger 125 or the encoding parameter value calculated during the encoding process, etc. and then to output a bitstream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Also, the residual signal may mean a difference between an original signal and a prediction signal. Also, the difference between the original signal and the prediction signal may be transformed to define the residual signal, or the difference between the original signal and the prediction signal may be transformed and quantized to define the residual signal. The residual signal can be called the residual block in the block unit, and can be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Accordingly, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Also, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, when necessary.

The dequantizer 135 dequantizes the values transform coefficients quantized by the quantizer 120. The inverse transformer 140 inversely transforms the values dequantized by the dequantizer 135.

The residual value or residual samples or residual samples array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
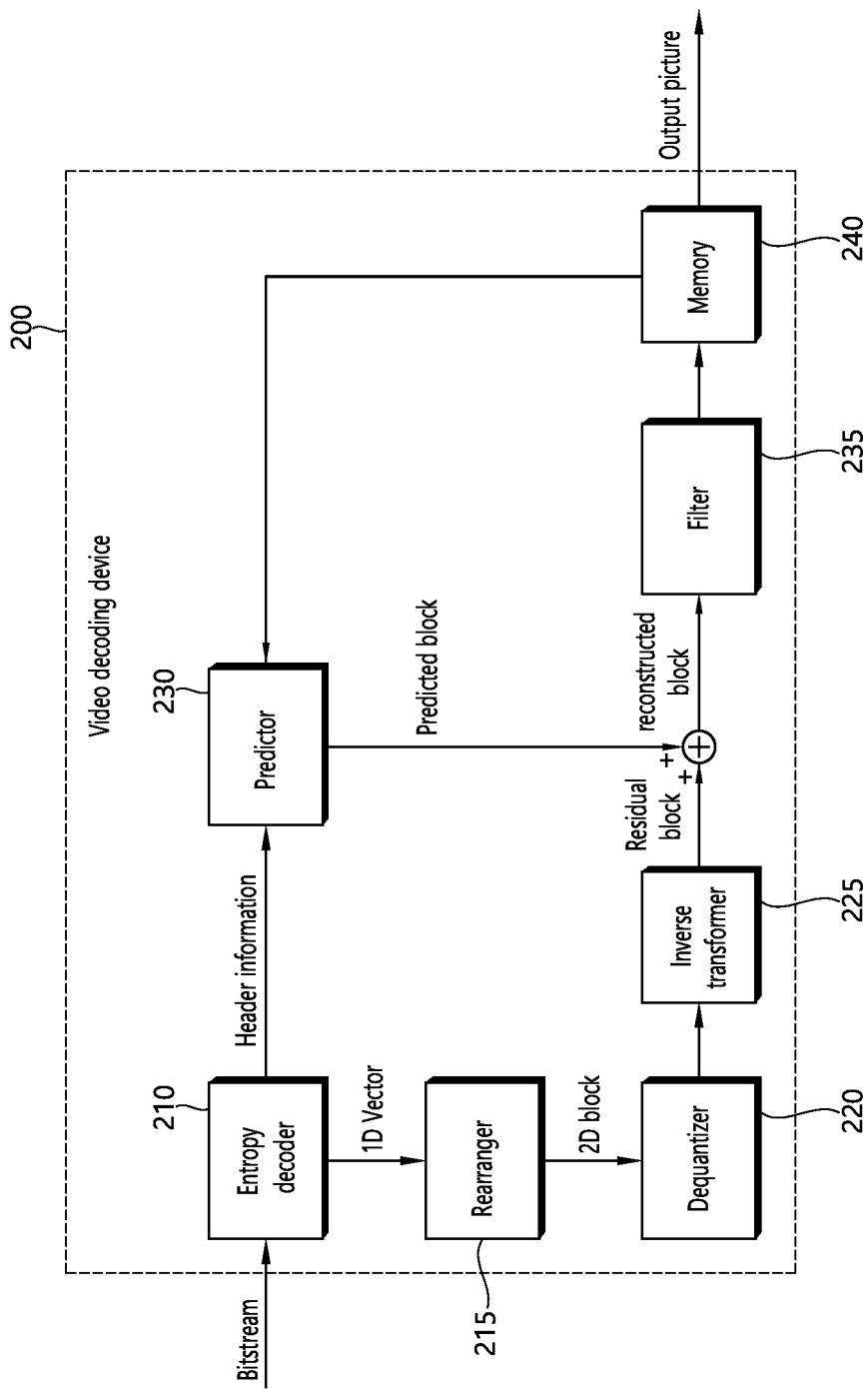
FIG. 2 is a block diagram schematically illustrating a video decoding apparatus according to an embodiment of the present invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bitstream is input from the video encoding device, the input bitstream may be decoded on the basis of the order in which video information is processed by the video encoding device.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoder 210 may perform decoding using the same VLC table as the encoding device used in the encoding device. Also, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bitstream information, that is, the quantized transform coefficients, entropy-decoded by the entropy decoder 210 on the basis of the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed on the basis of a transfer unit or a partition unit of a picture determined by the video encoding device. The transformer of the video encoding device may selectively perform the DCT and/or DST according to plural information pieces such as the prediction method, the size of a current block, and the prediction direction, and the inverse transformer 225 of the video decoding device may perform the inverse transform on the basis of the transform information on the transform performed by the transformer of the video encoding device.

The predictor 230 generates a prediction block including prediction samples or prediction samples array based on the prediction block generation-related information provided by the entropy decoder 210 and the previously decoded block and/or picture information provided from the memory 240.

When the prediction mode for the current PU is the intra prediction mode, the predictor 230 may perform the intra prediction to generate a prediction block based on pixel information in the current picture.

When the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Also, the encoding device may transmit a reference picture index indicating a reference picture to the decoding device.

The decoding device may predict the motion vector of the current block using the motion information of the neighboring block and derive the motion vector of the current block using the residual received from the encoding device. The decoding device may generate predicted block for the current block based on the derived motion vector and the reference picture index information received from the encoding device.

In another example, when the merge mode is applied, the encoder and decoder may generate a merge candidate list using the motion information of the reconstructed neighboring blocks and/or the motion information of the Col block. That is, when there is motion information of reconstructed neighboring blocks and/or Col blocks, the encoder and decoder may use the motion information as a merge candidate for the current block.

The encoder may select a merge candidate that may provide optimal encoding efficiency among the merge candidates included in the merge candidate list as motion information for the current block. In this connection, a merge index indicating the selected merge candidate may be included in the bitstream and transmitted to the decoder. The decoder may select one of the merge candidates included in the merge candidate list using the transmitted merge index. The decoder may determine the selected merge candidate as motion information of the current block. Accordingly, when the merge mode is applied, motion information corresponding to reconstructed neighboring blocks and/or Col blocks may be used as motion information of the current block. The decoder may reconstruct the current block by adding the predicted block and the residual transmitted from the encoder.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Accordingly, in the case of skip mode, the encoder does not transmit syntax information such as the residual to the decoding device in addition to information indicating which blocks motion information to use as the motion information for the current block.

The encoder and decoder may generate a predicted block of the current block by performing motion compensation on the current block based on the derived motion information. In this connection, the predicted block may be a motion compensated block generated by performing motion compensation on the current block. Also, a plurality of motion compensated blocks may constitute one motion compensated image.

The reconstructed block may be generated using the predicted block generated by the predictor 230 and the residual block provided by the inverse-transformer 225. FIG. 2 illustrates that using the adder, the predicted block and the residual block are combined to generate the reconstructed block. In this connection, the adder may be viewed as a separate element (a reconstructed block generator) that is configured to generate the reconstructed block. In this connection, the reconstructed block includes reconstructed samples or a reconstructed samples array as described above; the predicted block includes a prediction samples or a prediction samples array; the residual block may include a residual samples or a residual samples array. Accordingly, the reconstructed samples or the reconstructed samples array can be considered to be generated by combining the corresponding prediction samples or prediction samples array with the corresponding residual samples or residual samples array.

When the skip mode is used for a block, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parsor not shown in the drawing that parses information related to the encoded images included in a bitstream. The parser may include the entropy decoder 210, and may be included in the entropy decoder 210. Such a parsor may also be implemented as an element of the decoding module.

Figure 3:
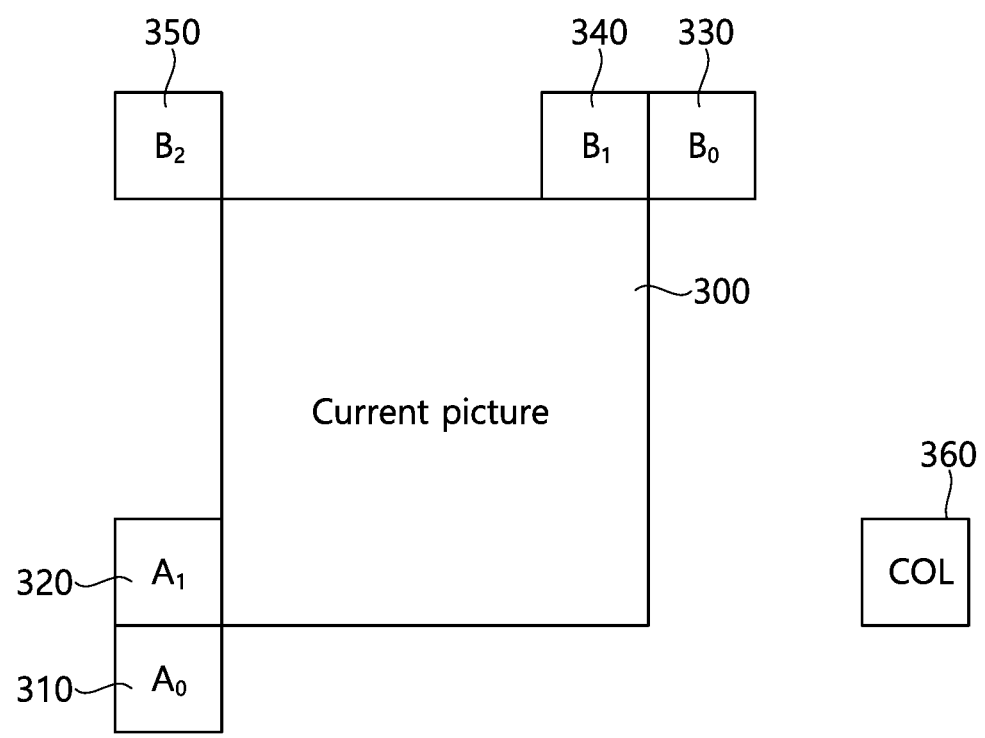
FIG. 3 is a block diagram schematically describing an embodiment of a candidate block usable in the case that an inter-prediction is performed for a current block.

FIG. 3 schematically illustrates an example of a candidate block that may be used when inter prediction is performed on a current block. In this connection, the current block may be a predicted block.

The prediction module of the encoder and decoder may use as candidate blocks, reconstructed neighboring blocks at predetermined positions around the current block 300. For example, in the example of FIG. 3, two blocks A0 310 and A1 320 located on the left side of the current block and three blocks B0 330, B1 340, and B2 350 above the current block may be selected as spatial candidate blocks. In this connection, the block A0 310 may be referred to as a lower left neighboring block, the block A1 320 may be referred to as a left neighboring block. The block B0 330 may be referred to as the upper right neighboring block. The block B1 340 is referred to as an upper neighboring block. The block B2 350 may be referred to as an upper left neighboring block.

Also, the above-mentioned Col block 360 may be used as a candidate block as a temporal candidate block in addition to the spatially adjacent blocks. Col block 360 may be referred to as a ColPb Col predicted block. The Col block is a block corresponding to the current block in a collocated picture (Col picture) which is one of the reconstructed reference pictures. The Col block may be a block existing in a predetermined relative position (ex. a position arithmetically shifted according to certain criteria from the center lower-right sample position or the lower-right neighboring sample of the block existing at the same position as the current block in the Col picture).

Specifically, in the merge mode, the MV of the optimal merge candidate among the merge candidate list generated based on the candidate blocks is used as the MV for the current block. The encoding device encodes merge index information indicating the selected merge candidate in the merge candidate list, and transmits the merge index information to the decoding device through a bitstream.

The decoding device may derive the MV of the merge candidate block selected from the merge candidate list as the MV for the current block based on the merge index information transmitted from the encoding device. The encoding device may derive a reference block on the reference picture based on the MV of the current block, and may use the reference block as a prediction block for the current block. That is, samples in the reference block may be used as prediction samples for the current block.

Specifically, in the AMVP mode, an optimal MVP for the current block is selected from an MVP candidate list including Motion Vector Predictor (MVP) candidates derived from the candidate blocks. In this case, the encoding device performs motion estimation to derive an optimal MVP from the MVP candidate list based on the derived MV of the current block, and calculates an MVD obtained by subtracting the MVP from the MV. The encoding device encodes MVP index information indicating which MVP candidate among the MVP candidates included in the MVP candidate list is the MVP for the current block and MVD information indicating the x axis value and the y axis value of the obtained MVD, and transmits the encoded information to the decoding device through bitstream.

The decoding device may derive the MVP for the current block from the MVP candidate list based on the MVP index information and MVD information transmitted from the encoding device, and may derive the MV of the current block by adding the MVD to the derived MVP. A reference block on the reference picture is derived based on the MV of the current block, and the reference block may be used as a prediction block for the current block. That is, the samples in the reference block may be used as prediction samples for the current block.

The decoding device may receive information on residual samples from the encoding device to generate the residual samples. The information on the residual samples may include information on the transform coefficients. Specifically, for example, the decoding device may receive the transform coefficients from the encoding device through the bitstream, and invert the transform coefficients to generate a residual block (or residual samples). Here, the residual sample may represent a difference between the original sample and the prediction sample, and the residual block may represent a difference between the original block including the original samples and the prediction block including the prediction samples.

Accordingly, as the prediction performance is improved, the amount of data for information on the residual samples can be reduced, thereby improving the overall coding efficiency.

However, since the current block is predicted using limited information in performing the prediction process, it is difficult to generate a prediction block almost identical to the original block by increasing the prediction performance. Thus, in the present disclosure, the prediction performance can be improved by applying filtering to a prediction block (prediction samples in the prediction block) based on reconstructed samples/block information located around the current block. In this case, the prediction performance can be improved by applying the Wiener filter-based filtering to the prediction samples of the prediction block. In order to apply the Wiener filter, filter coefficients need to be determined, and accordingly, information about the filter coefficients needs to be transmitted and received. In the present disclosure, the prediction accuracy of the prediction block can be improved by applying the Wiener filter generated using only a small amount of side information to the prediction block, and accordingly, the amount of data necessary for coding the residual block can be reduced, thereby improving the image compression efficiency. In this case, for the generating of the filter coefficient, it is possible to generate a more suitable filter by reflecting the prediction mode, the block partitioning information, and the block characteristic.

First, a process for deriving the filter coefficients is as follows.

Figure 4:
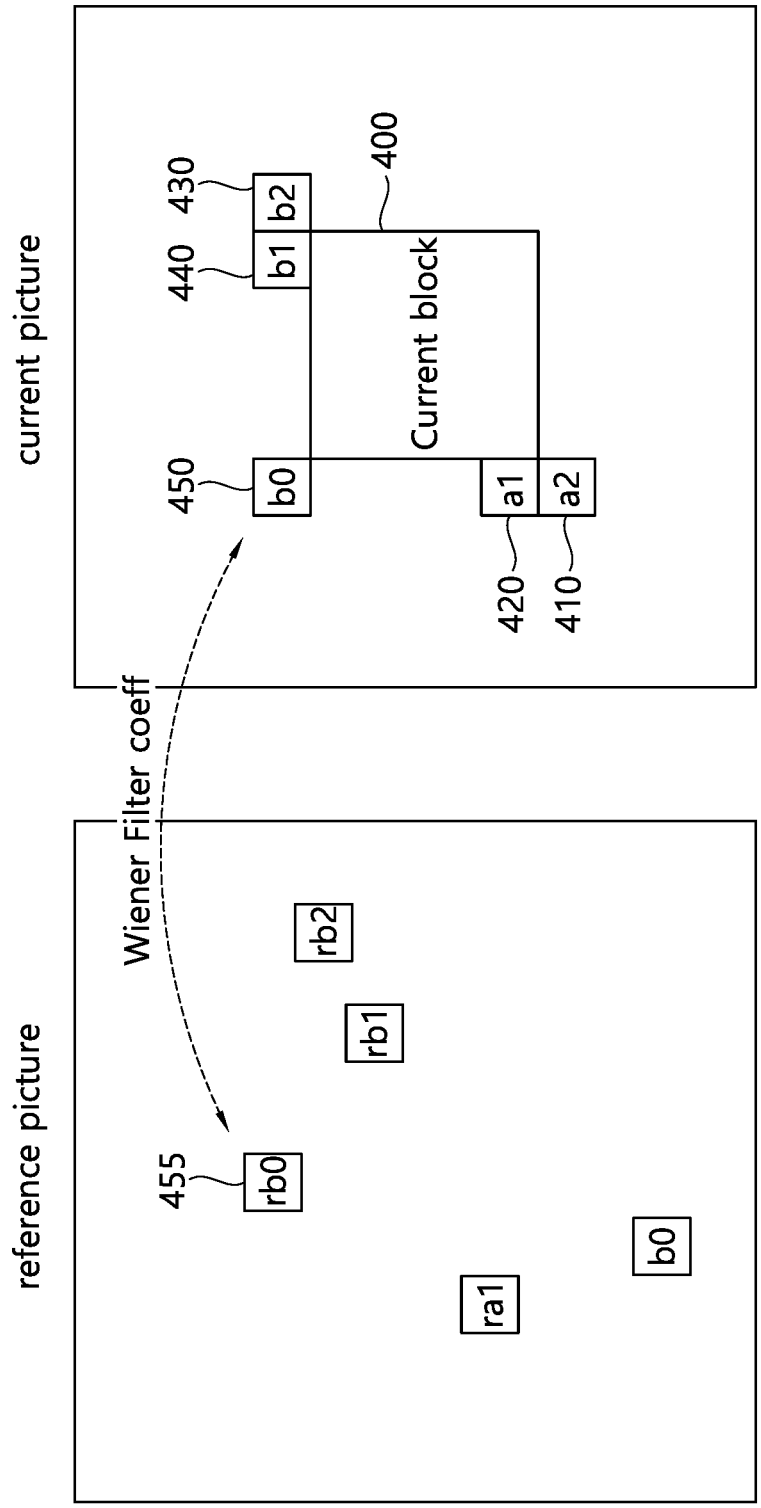
FIG. 4 exemplifies a method for deriving filter coefficients based on neighboring blocks of a current block.

FIG. 4 exemplarily shows a method of deriving filter coefficients based on neighboring blocks of a current block. Here, the current block may be a coding block (CB) or a coding unit (CU). Also, the neighboring blocks may be reconstructed blocks.

Referring to FIG. 4, the filter coefficients of the Wiener filter for a current block may be derived based on neighboring blocks 410, 420, 430, 440, and 450 of a current block 400. For example, the filter coefficients for each of neighboring blocks 410, 420, 430, 440, and 450 may be derived using a lower left neighboring block 410, a left neighboring block 420, an upper right neighboring block 430, an upper neighboring block 440, and an upper left neighboring block 450 of the current block 400. Also, additional filter coefficients may be derived by overall considering the filter coefficients for each of the neighboring blocks.

The filter coefficients candidates 410, 420, 430, 440 and 450 and/or the additional filter coefficients may be used as filter coefficient candidates, and the filter coefficients selected therefrom may be used as filter coefficients for the current block 400.

In this case, for example, the encoding device and the decoding device may derive the filter coefficients for the corresponding neighboring block based on a relationship between the neighboring block and a reference block of the corresponding neighboring block. For example, the reference block for the upper left neighboring block 450 may be a reference block 455. That is, the reference block 455 may be a block indicated by the MV of the upper left neighboring block 450 on a reference picture of the upper left neighboring block 450. In this case, filter coefficients for the upper left neighboring block 450 may be derived based on a relationship between the upper left neighboring block 450 and the reference block 455. This is the same for the other neighboring blocks.

A method of obtaining the filter coefficients for the corresponding neighboring block based on the relationship between a neighboring block and the reference block of the corresponding neighboring block may be performed as follows.

Figure 5:
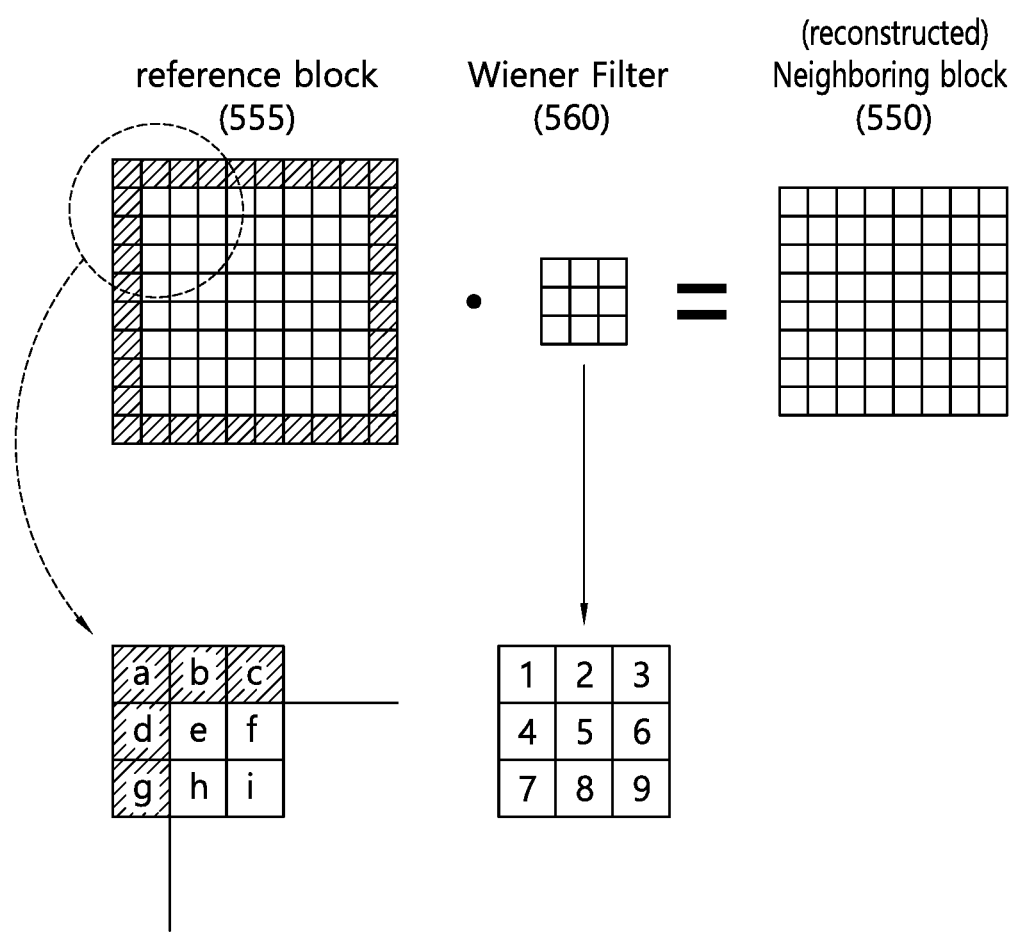
FIG. 5 illustrates an example of a method for obtaining Wiener filter coefficients for a neighboring block.

FIG. 5 shows an example of a method for obtaining Wiener filter coefficients for a neighboring block. It is assumed in FIG. 5 that the neighboring block and the reference block thereof have an 8×8 sample size and the Wiener filter has a 3×3 sample size.

Referring to FIG. 5, when the reference block 555 becomes equal or most similar to the neighboring block 550 by applying a Wiener filter 560 to the reference block 555, the filter coefficients of the corresponding Wiener filter 560 become the filter coefficients of the neighboring block 550.

The Wiener filter may be applied to the remaining samples sequentially from the top-left sample of the reference block 555 in a raster scan order. Since the size of the Wiener filter 560 is 3×3 in FIG. 5, in order to apply the Wiener filter 560 to boundary samples located within the boundary of the reference block 555, one row of samples and one column of samples are padded on the reference block 555, respectively. The size of the padding region may vary according to the size of the Wiener filter 560. For example, when the size of the Wiener filter 560 is 5×5, two rows of samples and two columns of samples may be padded on the reference block 555, respectively.

The filter coefficients of the Wiener filter 560 may be one-dimensionally arranged according to a predetermined order.

Here, the equation for obtaining the Wiener filter 560 may be as follows.

[Equation 1]

$$R^T R \cdot h = R^T O \quad (1)$$

Here, R is a matrix formed of samples of a reference block, h is a Wiener filter coefficient matrix, and O is a sample of a neighboring block. In addition, $R^T$ denotes a transpose matrix of the matrix R.

Referring again to FIG. 5, when the order of the Wiener filter coefficients is set as 1 to 9 as shown in the drawing, the order of the corresponding samples in the reference block may be set as a to i. In this case, Equation (1) can be expressed as follows.

[Equation 2]

$$\begin{bmatrix} a \\ b \\ c \\ d \\ e \\ f \\ g \\ h \\ i \end{bmatrix} [a\ b\ c\ d\ e\ f\ g\ h\ i] \cdot \begin{bmatrix} 1 \\ 2 \\ 3 \\ 4 \\ 5 \\ 6 \\ 7 \\ 8 \\ 9 \end{bmatrix} = \begin{bmatrix} a \\ b \\ c \\ d \\ e \\ f \\ g \\ h \\ i \end{bmatrix} \cdot O \quad (2)$$

In the above example, since the sizes of the reference block and the neighboring block are 8×8, a matrix relation like Equation (2) may be derived for each sample in the neighboring block, and a total of 64 relations may be derived for all samples in the neighboring block.

To simplify the mathematical expression, if a sum function may be applied to both sides of the mathematical expression, Equation (2) can be expressed as follows.

[Equation 3]

$$\Sigma R^T R \cdot h = \Sigma R^T O \quad (3)$$

When the sum operation is completed in Equation (3), a matrix expression is derived in each of the left and right sides. Here, since h is to be obtained, h can be obtained by multiplying the inverse matrix of the term before h by the left and right sides, respectively, and the Wiener filter coefficients can be obtained.

Referring again to FIG. 4, optimal filter coefficients for the current block may be selected based on the filter coefficient candidates thus obtained. The encoding device may apply the filter coefficients candidates to the current block, and based thereon, may select filter coefficients that minimize errors with the original block. In this case, the encoding device may encode a flag indicating whether the Wiener filter is enabled or not and an index of the selected filter coefficients, and transmit the encoded flag and index to the decoding device. The flag may be referred to as a filter flag, a Wiener filter flag, or a WF flag. The index may be referred to as a filter index, a Wiener filter index, or a WF index.

The decoding device may decode the received flag and index, may determine whether or not the Wiener filter is enabled for the current block based on the flag, and may derive filter coefficients for applying the Wiener filter based on the index from the neighboring blocks or from the filter coefficients candidates. For example, the index may indicate one of the filter coefficients candidates that are separately configured, or may indicate one of the neighbor candidate blocks. For example, when the index indicates one of the neighboring candidate blocks, the order of the index numbers may be determined in a random order. For example, the index numbers may be based on the order of the lower left neighboring block 410, the left neighboring block 420, the upper right neighboring block 430, the upper neighboring block 440, and the upper left neighboring block 450, or may be based on the order of the left neighboring block 420, the upper neighboring block 440, the upper right neighboring block 430, the lower left neighboring block 410, and the upper left neighboring block 450.

As shown in FIG. 4, when the lower left neighboring block 410 is a2, the left neighboring block 420 is a1, the upper right neighboring block 430 is b2, the upper neighboring block 440 is b1, and the upper left neighboring block 450 is b0, the order of the index numbers may follow one of the methods shown in Table 1 below.

TABLE 1

| Index | 0 | 1 | 2 | 3 | 4 | 5 |
|---|---|---|---|---|---|---|
| method 1 | a1 | b1 | b2 | a2 | b0 | |
| method 2 | a1 | a2 | b0 | b1 | b2 | |
| method 3 | a1 | b1 | b2 | a2 | b0 | all |
| method 4 | a1 | a2 | b0 | b1 | b2 | all |
| method 5 | all | a1 | b1 | b2 | a2 | b0 |
| method 6 | all | a1 | a2 | b0 | b1 | b2 |

In Table 1, 'all' means that additional filter coefficients are used, which are derived by integrating filter coefficients for each of the neighboring blocks.

Meanwhile, a Wiener filter coefficient for each of the neighboring blocks 410, 420, 430, 440 and 450 may be determined as the following unit, for example.
  a. Coding block including a neighboring block
  b. Prediction block including a neighboring block
  c. Minimum unit block having the same MV located in a position of neighboring block
  d. Block of a specific size which is predetermined
  e. Selective combination from a to d Meanwhile, it may be determined whether to apply a Wiener filter to a current block by referring to a prediction mode and a partitioning mode of the current block 400.

For example, the Wiener filter may not be applied in the following cases.
  a. The case that a prediction mode for the current block is skip mode
  b. The case that a partitioning mode of the current block is not 2N×2N
  c. Combination of a and b That is, an encoding apparatus may not transmit the flag in the above cases, and a decoding apparatus may determine that the Wiener filter is disabled implicitly.

In the case that a prediction mode of the current block is skip mode, prediction samples in the sufficiently similar level of original samples only with a prediction without a residual signal, or otherwise, it is in a state of able to obtain enough gain in the aspect of cost function by minimizing the amount of data required for signaling, and accordingly, it is available to make the Wiener filter be disable by considering a flag, which is additional information added for applying the Wiener filter, and the amount of data consumed for encoding.

In addition, in the case that the current block is a coding block and a partitioning mode of the cording block is not 2N×2N, the coding block is partitioned into a plurality of prediction blocks.

Figure 6:
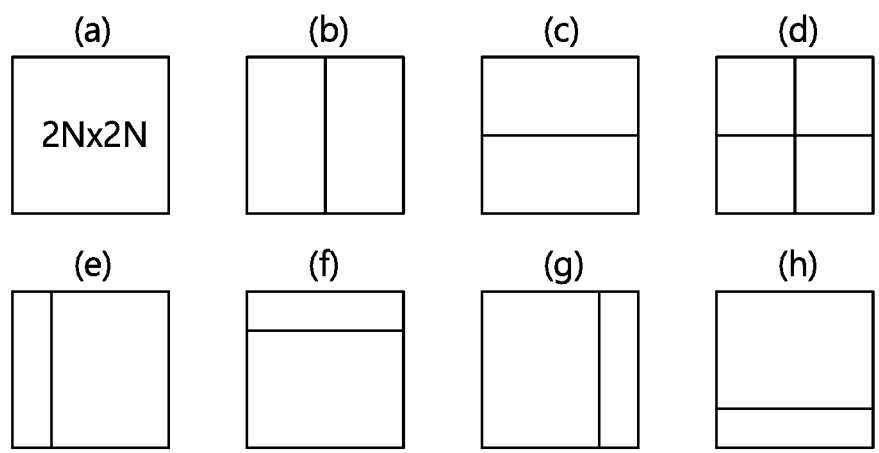
FIG. 6 illustrates the number and the shape of prediction blocks in a coding block according to a partitioning mode.

FIG. 6 illustrates the number and the shape of prediction blocks in a coding block according to a partitioning mode.

Referring to FIG. 6, (a) represents the partitioning mode is 2N×2N, (b) represents the partitioning mode is N×2N, (c) represents the partitioning mode is 2N×N, (d) represents the partitioning mode is N×N, (e) represents the partitioning mode is nL×2N, (f) represents the partitioning mode is 2N×nU, (g) represents the partitioning mode is nR×2N and (g) represents the partitioning mode is 2N×nD.

In the case that the partitioning mode of the coding block is not 2N×2N, the coding block is partitioned into a plurality of prediction blocks, and considering the fact that the prediction blocks may have different coding properties such as an MV, and the like, an efficiency of prediction may be decreased entirely when the same Wiener filter is applied to the prediction blocks. Accordingly, in the case that the partitioning mode is not 2N×2N, it may be implemented that the Wiener filter is disabled.

That is, in the case of (a) of FIG. 6, a flag representing whether to apply the Wiener filter is signaled explicitly, and in the remaining cases except (a), the Wiener filter may be disabled implicitly.

Figure 7:
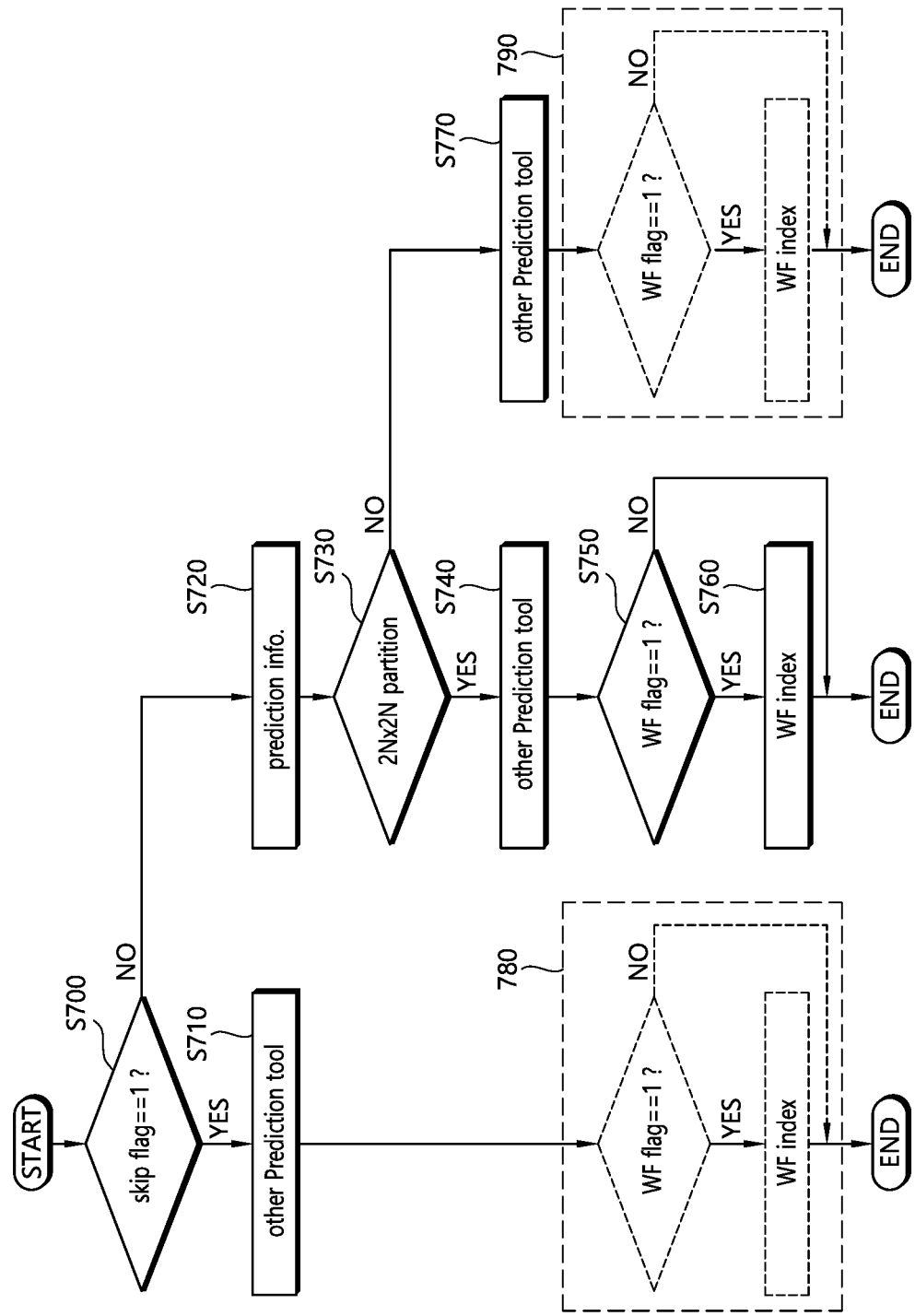
FIG. 7 illustrates an example that a Wiener filter is available/disable based on a prediction mode of a current block and a partitioning mode of the current block.

FIG. 7 illustrates an example that a Wiener filter is available/disable based on a prediction mode of a current block and a partitioning mode of the current block. Here, the current block may be a coding block.

Referring to FIG. 7, a decoding apparatus receives a skip flag through bit stream, and checks whether the value of the skip flag indicates 1 (step, S700). In the case that the value of the skip flag is 1, this represents that a prediction mode of the current block is a skip mode. The skip mode may mean that there is no residual signal for a difference between original samples and prediction samples for the current block. In the case that the value of the skip flag is 0, the skip mode is not applied for a prediction mode of the current block.

In the case that the value of the skip flag is 1 in step S700, the decoding apparatus performs a prediction procedure according to a prediction tool in relation to the skip mode (step, S710). For example, in the case that the value of the skip flag is 1, the decoding apparatus may not receive partitioning mode information f the current block, but derive a partitioning mode of the current block into 2N×2N. That is, in this case, the decoding apparatus may derive a prediction block that has the same size as a size of the coding block, and perform a prediction based on the skip mode of the corresponding prediction block. Particularly, for example, the decoding apparatus may receive a merge index, perform an inter-prediction using an MV of the current block as an MV of the block indicated by the merge index, and use the derived samples as reconstructed samples.

Meanwhile, in this case, the operations in area 780 are not performed. That is, the decoding apparatus may not receive/parse WF flag and WF index, and determines that the Wiener filter is not applied or not available, implicitly.

In the case that the value of the skip flag is 0 in step S700, the decoding apparatus receives information in relation to prediction (step, S720). Here, the information in relation to prediction may include information in relation to partitioning mode and information in relation to prediction mode. The information in relation to partitioning mode is a partitioning mode of the current block, and may indicate one of 2N×2N, N×2N, 2N×N, N×N, nL×2N, 2N×nU, nR×2N and 2N×nD. The information in relation to prediction mode indicates an inter-prediction mode of at least one prediction block in the current block. For example, the inter-prediction mode may include a merge mode and an AMVP mode.

The decoding apparatus checks whether the partitioning mode for the current block indicates 2N×2N (step, S730).

In the case that the partitioning mode for the current block is 2N×2N in step S730, the decoding apparatus performs a prediction procedure according to a related prediction tool (step, S740). For example, the decoding apparatus may derive a prediction block that has the same size as a size of the coding block, which is the current block, and perform an inter-prediction for the corresponding prediction block. For example, the decoding apparatus parses a merge flag, and based on it, determines whether a merge mode is applied or an advanced motion vector prediction (AMVP) mode is applied to the prediction block. In the case that the merge mode is applied, the decoding apparatus may parse a merge index, derive an MV of a neighboring block as an MV of the prediction block based on the merge index, and generate prediction samples based on the derived MV. Or, in the case that the AMVP mode is applied, the decoding apparatus may parse an mvp index, derive an MV of a neighboring block as MVP of the prediction block based on the mvp index, derive an MV by adding received MVD to the MVP, and generate prediction samples based on the derived MV.

The decoding apparatus parses WF flag, and checks whether the value of the WF flag indicates 1 (step, S750). In the case that the value of the WF flag indicates 1, this means that the Wiener filter for the current block is available or applied. In the case that the value of the WF flag indicates 0, this means that the Wiener filter for the current block is not available.

In the case that the value of the WF flag is 1 in step S750, the decoding apparatus parses a WF index and derives the WF index and Wiener filter coefficients of the current block based on neighboring blocks of the current block (step, S760). The decoding apparatus may apply filtering to the prediction samples in the current block based on the Wiener filter coefficients, and may reduce a difference between prediction samples and original samples.

In the case that the partitioning mode for the current block is 2N×2N in step S730, the decoding apparatus partitions the current block into a plurality of prediction blocks based on the corresponding partitioning mode, and performs a prediction procedure according to the related prediction tool for the prediction blocks (step, S770). For example, the decoding apparatus may derive a plurality of prediction blocks from the coding block, which is the current block, according to the partitioning mode, and perform an inter-prediction for each of the corresponding prediction blocks. For example, the decoding apparatus parses a merge flag for each of the prediction blocks, and based on it, determines whether a merge mode is applied or an advanced motion vector prediction (AMVP) mode is applied to the prediction block, and performs an inter-prediction according to the determined mode.

Meanwhile, in this case, the operations in area 790 are not performed. That is, the decoding apparatus may not receive/parse WF flag and WF index, and determines that the Wiener filter is not applied or not available, implicitly.

Meanwhile, the application of the Wiener filter may be performed in a unit of prediction block, not a unit of coding block. In the case that a partitioning mode is not 2N×2N, a plurality of prediction blocks is existed in the same coding block, and in this case, a restriction occurs when deriving a neighboring block which is going to be used for deriving Wiener filter coefficients.

Figure 8:
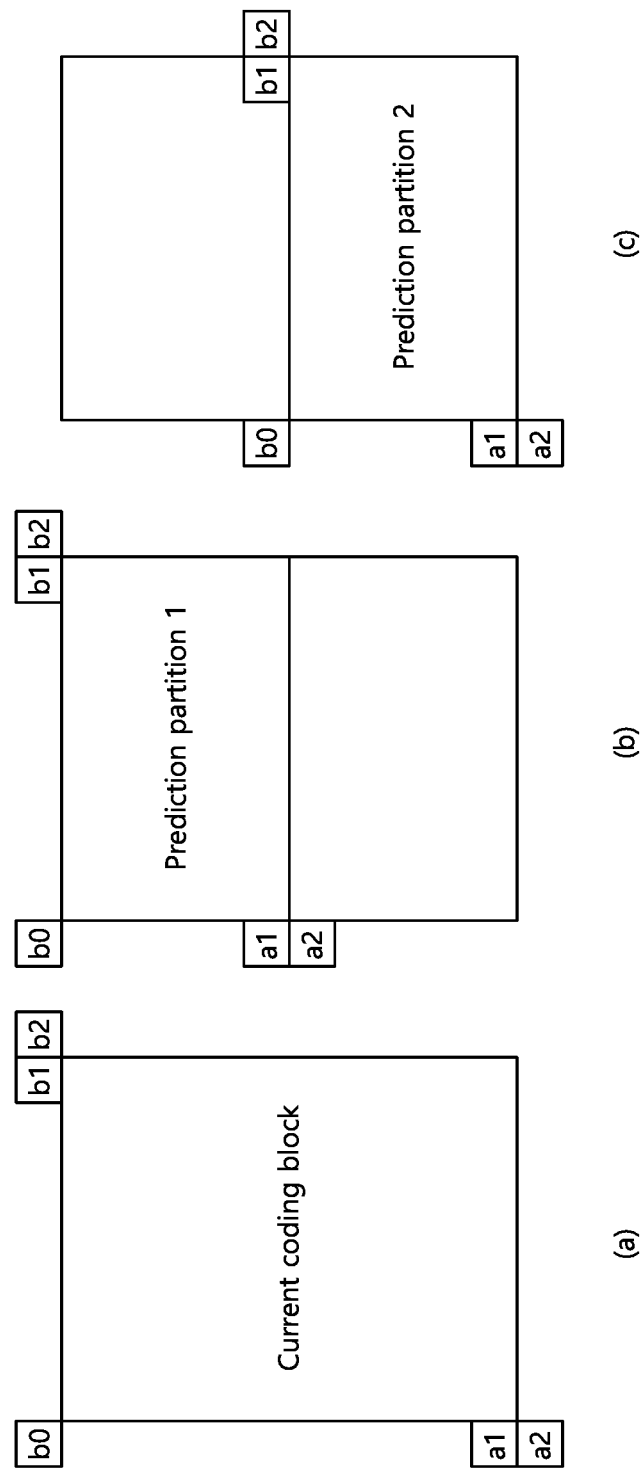
FIG. 8 illustrates an example of neighboring blocks that may be considered for deriving Wiener filter coefficients.

FIG. 8 illustrates an example of neighboring blocks that may be considered for deriving Wiener filter coefficients. In FIG. 8, (a) represents neighboring blocks considered when the Wiener filter is applied in a unit of coding block and (b) and (c) represent neighboring blocks considered when the Wiener filter is applied in a unit of prediction block. Here, (b) shows neighboring blocks for the first prediction block (partIdx=0) with partitioning mode 2N×N and (c) shows neighboring blocks for the second prediction block (partIdx=1) with partitioning mode 2N×N Referring to FIG. 8, the area of neighboring blocks considered for deriving Wiener filter coefficients for each of the first prediction block and the second prediction block of (b) and (c) is different from the area of neighboring blocks considered for deriving Wiener filter coefficients for a coding block of (a).

Particularly, in the case that residual samples are added in a unit of coding block, that is, in the case that prediction samples are obtained in a unit of prediction block in a coding block and the prediction samples for the entire coding block is obtained, and then the residual samples are added in a unit of the coding block, in the timing of applying the Wiener filter for the second prediction block, the first prediction block is in the state of not completely reconstructed yet. Accordingly, the upper neighboring block for the second prediction block is not available yet in (c) and is needed to be excluded from the candidate for deriving Wiener filter coefficients.

FIG. 9 shows an example of neighboring blocks that may be considered for deriving Wiener filter coefficients for each prediction block in the case that the partitioning mode is N×N. FIG. 9 (a) shows the neighboring blocks for the first prediction block (partIdx=0) having the partitioning mode N×N, (b) shows the neighboring blocks for the second prediction block (partIdx=1) having the partitioning mode N×N, (c) shows the neighboring blocks for the third prediction block (partIdx=2) having the partitioning mode N×N, and (d) shows the neighboring blocks for the fourth prediction block (partIdx=3) having the partitioning mode N×N.

Referring to FIG. 9, in the case of (a), (b) and (c), like the cases of (b) and (c) of FIG. 8, positions of neighboring (candidate) blocks are determined based on the corresponding prediction block, and the block (the shaded part) belonged to other prediction block in the same coding block is not available among the neighboring blocks.

In addition, in the case of (d), a1, b0 and b1 among the neighboring blocks are not available since a1, b0 and b1 are blocks belonged to other prediction block in the current coding block, and a2 and b2 are also not available since a2 and b2 are belonged to the coding block which is reconstructed after the reconstruction of the current block is completed according to the raster scan order. Accordingly, in the case of (d), the neighboring blocks available for deriving Wiener filter coefficient are not existed. Therefore, in the case that the current prediction block indicates the fourth prediction block (partIdx=3) having the partitioning mode N×N, the following operation and restriction may be applied for the current prediction block.

As an example, with respect to the current prediction block, an application of the Wiener filter is disabled for all times, and a transmission of the Wiener filter related information (e.g., WF flag and WF index) is also not performed.

As another example, one of Wiener filter coefficients used for other prediction blocks is selected and used in the same coding block. In this case, WF index indicates from which prediction block the Wiener filter coefficients are used among other neighboring prediction blocks in the same coding block based on the current prediction block. In the case that the Wiener filter is not applied for all other prediction blocks in the same coding block, an application of the Wiener filter is disabled for the current block, and a transmission of the Wiener filter related information is also not performed.

Meanwhile, in the embodiment described above, the method for obtaining Wiener filter coefficients are described based on spatial neighboring candidate blocks, and temporal candidate block may be further considered for deriving Wiener filter coefficients of the current block. That is, in this case, Wiener filter coefficients may be obtained for the current block by using temporal prediction information. Here, the current block may be a prediction block or a coding block, for example.

Figure 10:
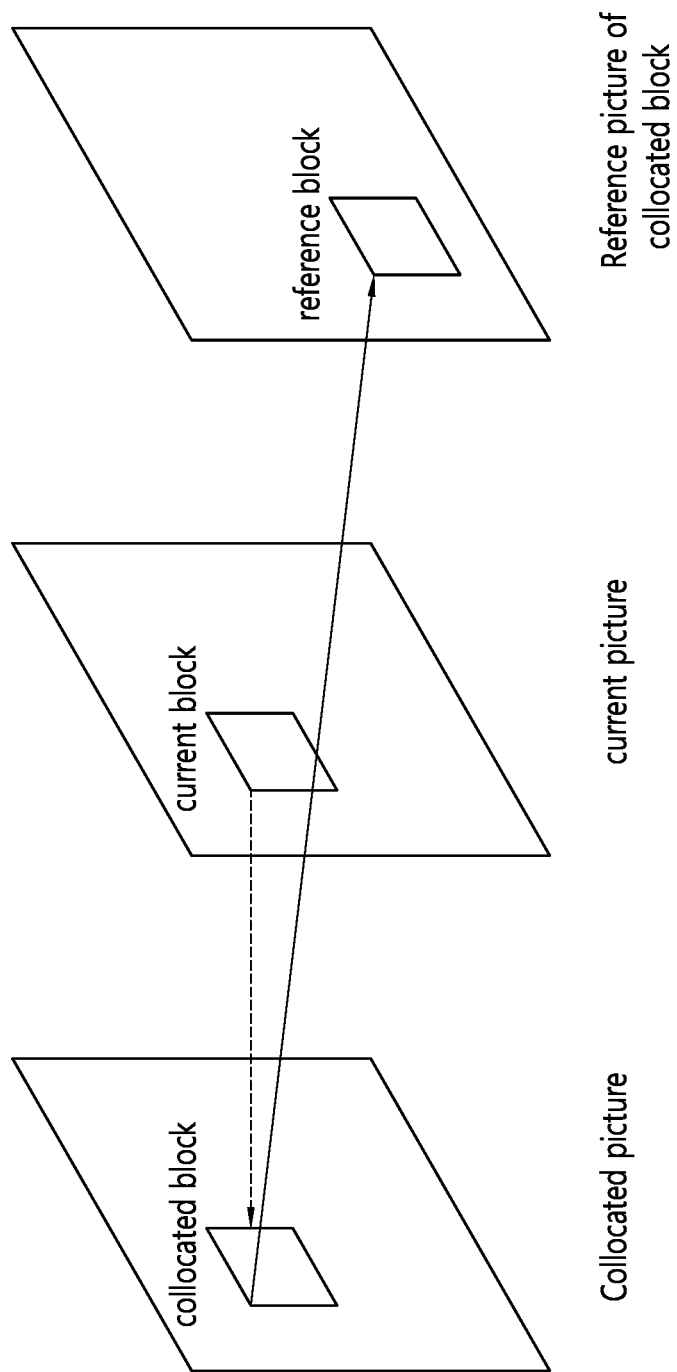
FIG. 10 illustrates an example of a method for obtaining a temporal predictor for obtaining Wiener filter coefficients. Here, the temporal predictor may indicate a temporal candidate block.

FIG. 10 illustrates an example of a method for obtaining a temporal predictor for obtaining Wiener filter coefficients. Here, the temporal predictor may indicate a temporal candidate block.

Referring to FIG. 10, a temporal predictor may be obtained from a collocated block existed in the same position as the current block within a collocated picture which is one of reconstructed reference pictures. The collocated picture may be designated for a current slice in which the current block is included or determined by signaling.

Meanwhile, in an image coding system, according to image characteristics, a split and partitioning structures may be differently configured for each picture. Accordingly, a collocated block may be a part of a single block, for example, or include a plurality blocks on a collocated picture.

Accordingly, for obtaining a temporal predictor based on the collocated block, blocks in positions shown in FIG. 11 below may be considered.

Figure 11:
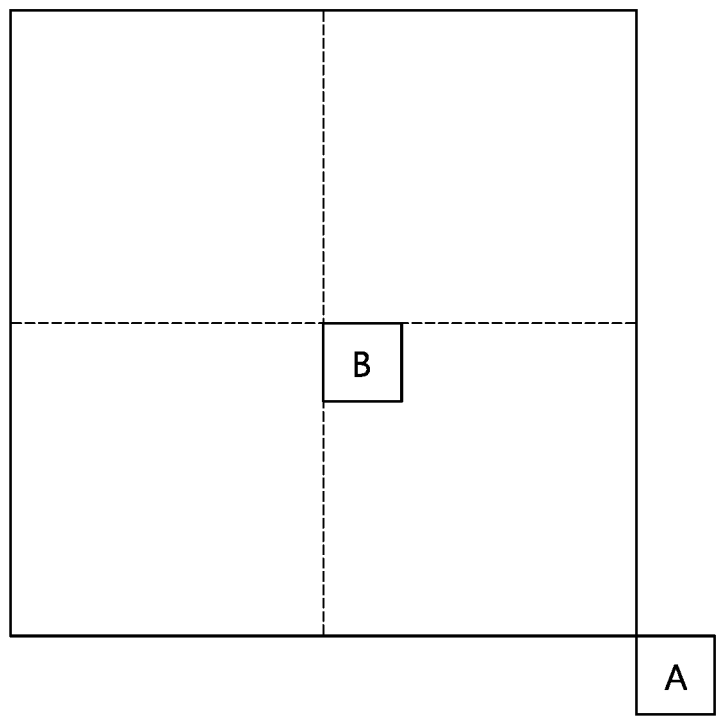
FIG. 11 illustrates an example of candidate blocks considered for obtaining a temporal predictor.

FIG. 11 illustrates an example of candidate blocks considered for obtaining a temporal predictor.

Referring to FIG. 11, in order to obtain a temporal prediction, the collocated block is not used without any change, but a bottom-right neighboring block A or a center bottom-right block B of the collocated block may be used. In this case, in the case that the bottom-right neighboring block A is available, motion information of the bottom-right neighboring block A may be used, and in the case that the bottom-right neighboring block A is disable, motion information of the center bottom-right block B may be used. Here, the bottom-right neighboring block A may be represented based on a top-left sample position (a first sample position) of the bottom-right neighboring block A, and the center bottom-right block B may be represented based on a top-left sample position (a second sample position) of the center bottom-right block B. In addition, here, in the case that the first sample position is located outside of boundary of the collocated picture or the first sample position is located outside of a CTU (or the largest coding unit (LCU)) to which the collocated block is belonged based on y-axis direction, the bottom-right neighboring block A (and the first sample position) may not be available. In addition, in the case that the bottom-right neighboring block A is intra-predicted, the bottom-right neighboring block A may not be available.

In this case, a reference block on a reference picture for the bottom-right neighboring block A may be found by using an MV for the bottom-right neighboring block A, and based on the bottom-right neighboring block A and the reference block, Wiener filter coefficients may be obtained. Alternatively, a reference block on a reference picture for the center bottom-right block B may be found by using an MV for the center bottom-right block B, and based on the center bottom-right block B and the reference block; Wiener filter coefficients may be obtained. Here, the method for obtaining Wiener filter coefficients is as described above.

Meanwhile, in order to obtain the Wiener filter coefficients, as shown in FIG. 11 above, when the bottom-right neighboring block A or the center bottom-right block B and the reference block are used, a unit of obtaining the Wiener filter coefficients may be determined as below. Here, the bottom-right neighboring block A or the center bottom-right block B may be called a corresponding block.

a. Coding block including a corresponding block
b. Prediction block including a corresponding block
c. Minimum unit block having the same MV located in a position of corresponding block
d. Block of a specific size which is predetermined
e. Selective combination from a to d In addition, since a temporal candidate block is further added to the spatial neighboring candidate blocks for obtaining the Wiener filter coefficient, an order of index numbers of WF index may follow one of the methods represented in Table below. The temporal candidate block may be represented as T (or Col).

TABLE 2

| Index | 0 | 1 | 2 | 3 | 4 | 5 | 6 |
|---|---|---|---|---|---|---|---|
| method 1 | a1 | b1 | b2 | a2 | b0 | T | |
| method 2 | a1 | a2 | b0 | b1 | b2 | T | |
| method 3 | a1 | b1 | b2 | a2 | b0 | all | T |

TABLE 2-continued

| Index | 0 | 1 | 2 | 3 | 4 | 5 | 6 |
|---|---|---|---|---|---|---|---|
| method 4 | a1 | a2 | b0 | b1 | b2 | all | T |
| method 5 | all | a1 | b1 | b2 | a2 | b0 | T |
| method 6 | all | a1 | a2 | b0 | b1 | b2 | T |

In Table 2, T is added following each index order in Table 1. However, this is just an example, but T may be inserted instead of 'all' in Table 1, and an arbitrary index order derived based on an experiment may be used. Alternatively, a position of T in the index order may be determined by sequence parameter set (SPS) or picture parameter, or signaled in a slice level.

Meanwhile, the Wiener filter coefficient may be obtained from the block including the temporal prediction information and the reference block as described above, but the Wiener filter coefficient may be obtained from information of wider area. Here, the area may be defined as below in a collocated picture.

a. Coding tree block (CTB) including a temporal predictor
b. CTB row or CTB column including a temporal predictor
c. Entire slice or entire picture including a temporal predictor
d. All blocks in a slice or picture having a motion vector of the same phase as a motion vector phase of a temporal predictor
e. Area of a slice or picture partitioned into an arbitrary number having a predetermined size. At this time, the partitioned area is constructed as a multiple of CTB except the area located the very left end and the very bottom end.
f. Selective combination from a to e For reference, the phase of a motion vector in section d may be represented as below.

Figure 12:
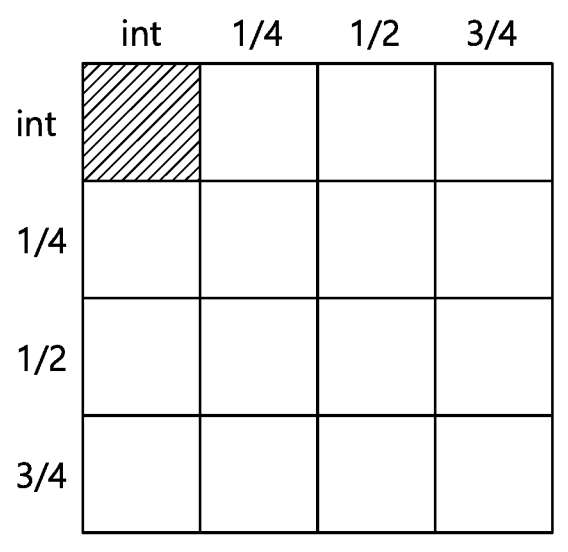

FIG. 12 illustrates an example of a motion vector phase according to the present invention.

Referring to FIG. 12, a block corresponds to a phase, and in the case that a motion vector supports ¼ sample (or pixel) accuracy, that is, a motion vector indicates ¼ fractional sample unit, total 16 types of phases may be derived based on an integer sample of (x, y)=(int, int) for the motion vector.

Accordingly, in the case that section d is applied, Wiener filter coefficients may be obtained based on all prediction blocks and the reference blocks having the same phase as a motion vector phase of a temporal predictor in a collocated picture. Here, the prediction blocks may be those of being existed in the same slice or the same picture.

In addition, a slice in a collocated picture or the collocated picture in section e may be partitioned into areas having the same size and of a multiple of CTB. In this case, the partitioned area may be represented as below.

Figure 13:
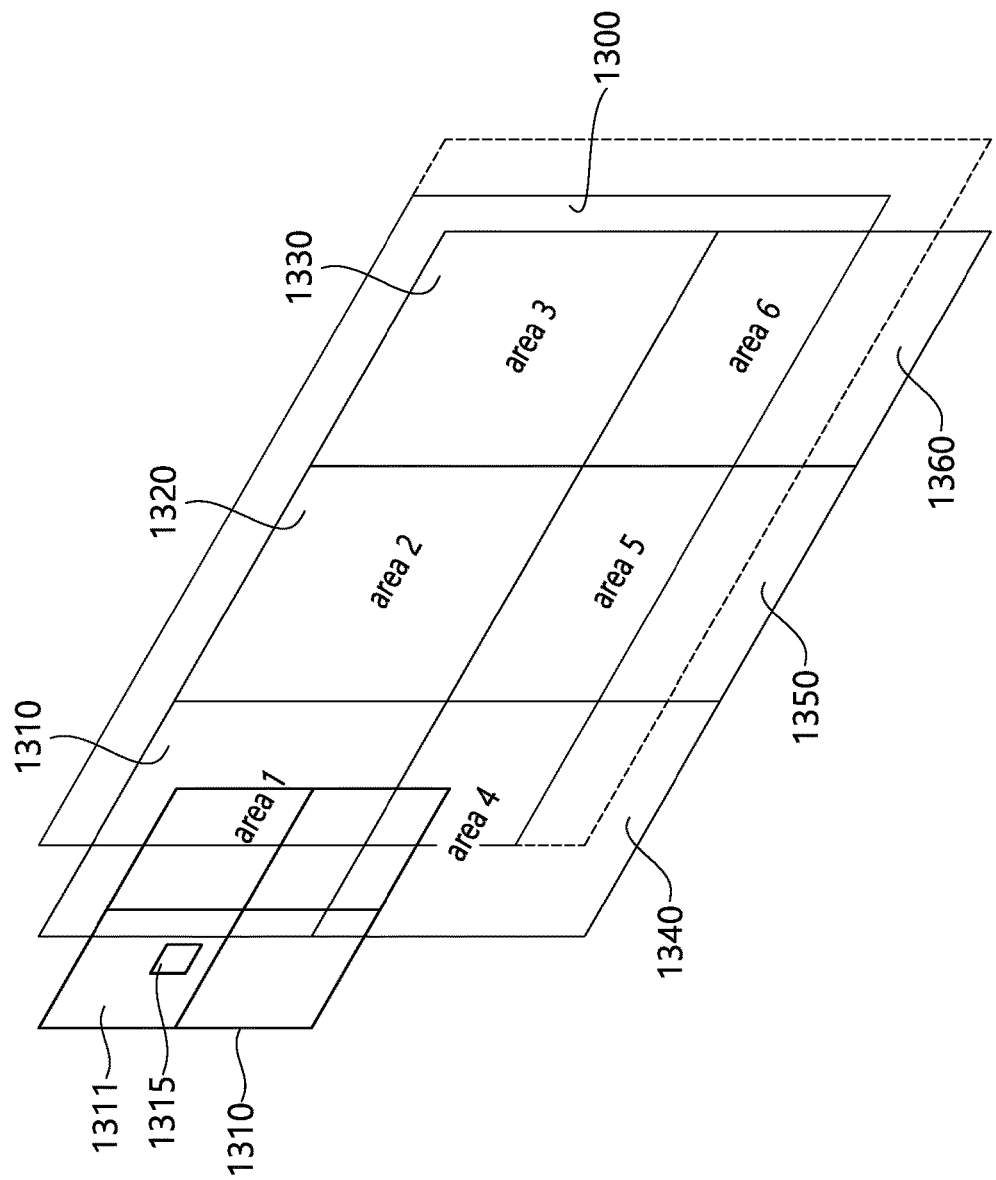
FIG. 13 illustrates a partitioned area for obtaining a Wiener filter coefficient according to the present invention.

FIG. 13 illustrates a partitioned area for obtaining a Wiener filter coefficient according to the present invention.

Referring to FIG. 13, a collocated picture 1300 may be partitioned into areas having the same size. In the case of constructing areas in a unit of 4 CTBs, the collocated picture 1300 may be partitioned into a first area 1310, a second area 1320, a third area 1330, a fourth area 1340, a fifth area 1350 and a six area 1360 as shown in the drawing.

Here, in the case that a temporal predictor 1315 is located in a CTB 1311 and the CTB 1311 is located in the first are 1310, that is, the temporal predictor 1315 is located in the first area 1310, the first area 1310 is determined as an area for obtaining the Wiener filter coefficients. In this case, by utilizing all blocks and the reference blocks included in the first area 1310, the Wiener filter coefficients for the first area 1310 may be obtained.

Meanwhile, in the case that the corresponding area exceeds a boundary of the collocated picture 1300 such as the third area 1330, the Wiener filter coefficients are derived using those belonged to the third area 1330 only among the (prediction) blocks within the boundary of the collocated picture 1300. Likewise, in the case of the fourth area 1340, the fifth area 1350 and the sixth area 1360, the Wiener filter coefficients are derived using those belonged to the corresponding area only among the (prediction) blocks within the boundary of the collocated picture 1300.

Meanwhile, in the case that a prediction mode of the current (prediction) block is a skip mode or a merge mode and a partitioning mode is 2N×2N, a candidate block which is the same as the candidate block indicated by a merge index among merge candidate blocks are used for deriving the Wiener filter coefficients. That is, in this case, a temporal merge candidate may be used as the temporal predictor (i.e., temporal candidate for the Wiener filter coefficients). In other words, in this case, the Wiener filter candidates are located in the positions of the merge candidates. Since the fact that a specific candidate is selected in a skip mode or a merge mode may be interpreted as the corresponding candidate has the property which is the most similar to the current block, the Wiener filter coefficients are derived from the corresponding candidate block and used for the current block, and in this case, an amount of data required for encoding WF index separately may be reduced.

At this time, conditions for inducing an index for deriving the Wiener filter coefficients from the merge index may be as below.

a. The case that a prediction mode for the current block is skip mode b. The case that a partitioning mode of the current block is 2N×2N and a prediction mode of the current block is a merge mode c. The case of satisfying both of a and b d. Selective combination from a to c Here, in the skip mode and the merge mode, in the case that a temporal candidate is indicated by the merge index, the Wiener filter coefficients may be derived by using the above-described method and so on in FIG. 8 and FIG. 9.

Figure 14:
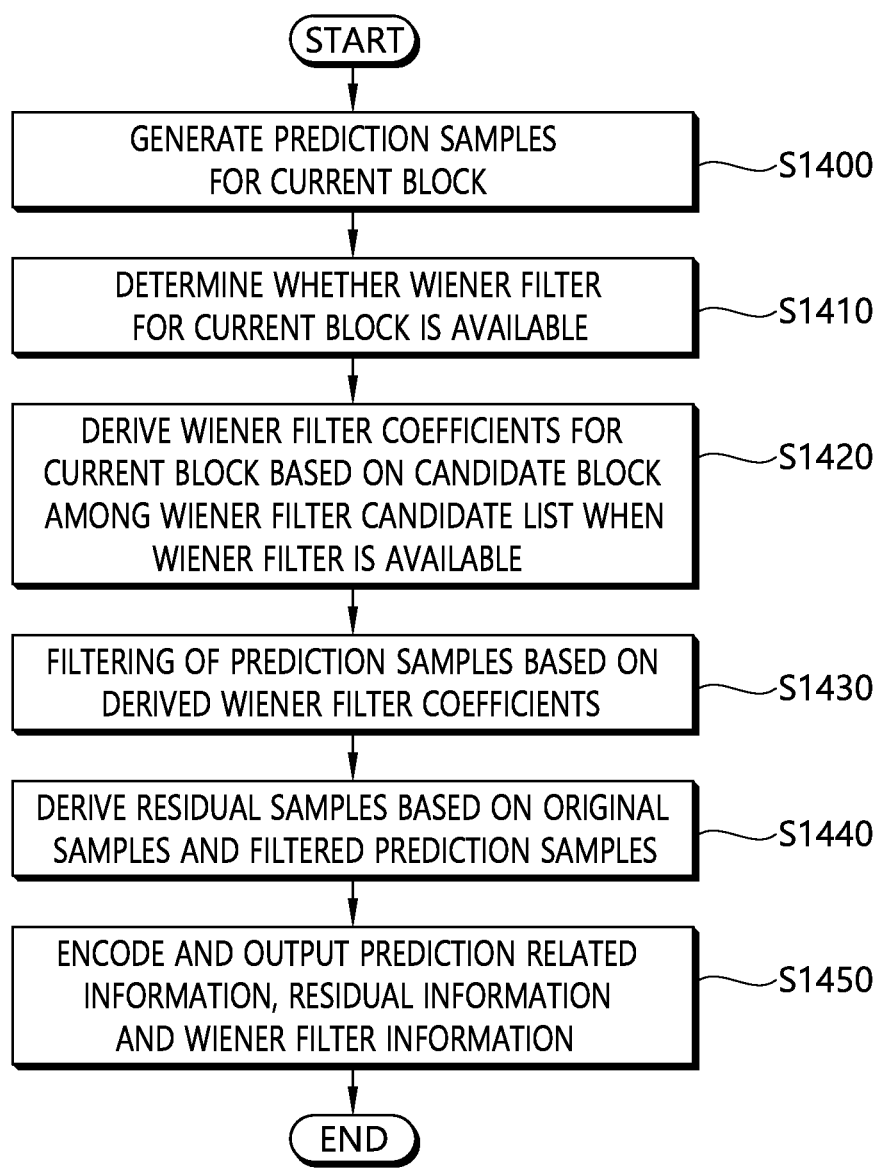
FIG. 14 illustrates an example of an image encoding method according to the present invention schematically.

FIG. 14 illustrates an example of an image encoding method according to the present invention schematically. The method described in FIG. 14 may be performed by an encoding apparatus.

Referring to FIG. 14, the encoding apparatus generates prediction samples for a current block (step, S1400). Here, the current block may be a coding block or a prediction block. In the case that the current block is a coding block, according to partitioning mode, the coding block may include one or a plurality of prediction blocks. The encoding apparatus may derive an MV through motion estimation for each of the one or a plurality of prediction blocks, find a reference block on a reference picture reconstructed based on the derived MV for each of the prediction blocks, and derive a prediction sample of the corresponding prediction block based on a reconstructed sample in the reference block. The encoding apparatus may collect the prediction samples generated in a unit of prediction block and derive the prediction samples for the coding block.

Alternatively, in the case that the current block is a prediction block, the encoding apparatus may derive an optimal MV through motion estimation for the corresponding prediction block, find a reference block on a reference picture reconstructed based on the derived MV for the corresponding prediction block, and derive a prediction sample of the corresponding prediction block based on a reconstructed sample in the reference block.

The encoding apparatus determines whether the Wiener filter for the current block is available (step, S1410). The encoding apparatus may determine whether the Wiener filter is available by comparing rate-distortion (RD) cost between the case of applying the Wiener filter and the case of not applying the Wiener filter. The encoding apparatus may generate a Wiener filter flag based on the result of determination. The encoding apparatus may set a value of the Wiener filter flag to 1 when the Wiener filter is available, and set a value of the Wiener filter flag to 0 when the Wiener filter is not available.

In addition, the encoding apparatus may determine whether the Wiener filter is not available in at least one case of the case that a prediction mode for the current block is a skip mode or the case that a partitioning mode is 2N×2N. In this case, the encoding apparatus may not generate the Wiener filter flag. This is because a decoding apparatus may also determine that the Wiener filter is not available implicitly according to the same reference of determination.

Furthermore, in the case that the current block is a prediction block, the prediction block is partitioned based on a partitioning mode of N×N from a coding block, and the prediction block is a prediction block of which partIdx is 3 with partitioning mode N×N in the coding block, the encoding apparatus may determine that the Wiener filter is not available. In this case, the encoding apparatus may not generate the Wiener filter flag owing to the same reason as described above.

The encoding apparatus derives Wiener filter coefficients for the current block based on a candidate among a Wiener filter candidate list in the case that the Wiener filter is available (step, S1420). The encoding apparatus may generate the Wiener filter candidate list based on spatial neighboring blocks. Alternatively, the encoding apparatus may further generate the Wiener filter candidate list based on a temporal corresponding block. The Wiener filter candidate list may include Wiener filter candidates represented in Table 1 and Table 2 described above. The encoding apparatus may generate a Wiener filter index indicating a Wiener filter candidate which is selected among the Wiener filter candidate list.

Meanwhile, in the case that the current block is a prediction block and the prediction mode for the current block is a skip mode or a merge mode, the encoding apparatus may select a candidate block of the index indicated by the merge index among the Wiener filter candidate list, and derive the Wiener filter coefficients for the selected candidate block as the Wiener filter coefficients for the current block.

The Wiener filter coefficients for the selected candidate block may be derived based on the relation between the candidate block and the reference block of the candidate block. Particularly, a method for deriving the Wiener filter coefficients for each of the spatial neighboring blocks or the temporal corresponding block is as described in the description for FIG. 5.

Here, as an example, the temporal corresponding block may be a bottom-right neighboring block or a center bottom-right block of the collocated block located on the collocated picture which is one of the reference pictures.

As another example, the temporal corresponding block may be a block located on a position of arithmetic left shifted after being arithmetic left shifted by n to x axis and y axis from a bottom-right neighboring block or a center bottom-right block of the collocated block located on the collocated picture which is one of the reference pictures. That is, the temporal corresponding block may be a block that covers $((x_0>>n)<<n, (y_0>>n)<<n)$ sample position, when a top-left sample position of the bottom-right neighboring block or the center bottom-right block is $(x_0, y_0)$. Here, n is a positive integer, and may be one of 2, 3, 4, 5 or 6, and the like.

As another example, the temporal corresponding block may be a coding block (CB) or a coding tree block (CTB) including a bottom-right neighboring block or a center bottom-right block of the collocated block located on the collocated picture which is one of the reference pictures.

As another example, the temporal corresponding block may be a CTB row or a CTB column including a bottom-right neighboring block or a center bottom-right block of the collocated block located on the collocated picture which is one of the reference pictures.

As another example, the temporal corresponding block may correspond to an area having a motion vector of the same phase as the motion vector phase of a bottom-right neighboring block or a center bottom-right block of the collocated block located on the collocated picture which is one of the reference pictures.

As another example, the temporal corresponding block may be an area including a bottom-right neighboring block or a center bottom-right block of the collocated block located on the collocated picture which is one of the reference pictures, and the area may be an area of the collocated picture or a slice in the collocated picture partitioned by a predetermined size and a number. In this case, the width and/or the height of the area may be a multiple of CTB.

Meanwhile, in the case that the current block is a prediction block, the prediction block is partitioned based on a partitioning mode of N×N from a coding block, and the prediction block is a prediction block of which partIdx is 3 with partitioning mode N×N in the coding block, the Wiener filter candidate list may be generated based on the prediction blocks of which partIdx is 0 to 2 located in the coding block, the encoding apparatus select one of the prediction blocks of which partIdx is 0 to 2 located in the coding block in order to derive the Wiener filter coefficients for the current block, and the encoding apparatus may generate the Wiener filter coefficients that indicate the selected prediction block coefficients among the prediction blocks of which partIdx is 0 to 2 located in the coding block. In this case, the Wiener filter coefficients for the selected prediction block may be the same as the Wiener filter coefficients selected for filtering the selected prediction block.

The encoding apparatus performs filtering of the prediction samples for the current block based on the derived Wiener filter coefficients (step, S1430). The encoding apparatus may generate prediction samples more similar to an original sample through the filtering, and through this, may reduce the amount of data for residual samples.

The encoding apparatus derives residual samples based on original samples and the filtered prediction samples (step, S1440). The encoding apparatus may derive the residual samples through deduction between the original samples in an original picture corresponding to the current block and the filtered prediction samples.

The encoding apparatus encodes and outputs prediction related information, residual information and Wiener filter information (step, S1450). The encoding apparatus may entropy-encode the prediction related information, the residual information and the Wiener filter information and output in a bit stream form. The output bit stream may be transmitted or sent to a decoding apparatus through a network or a storage medium.

Here, the prediction related information may include prediction mode information and partitioning mode information of the current block. The residual information is information of the residual samples, and may include transform coefficients in a frequency domain for the residual samples, for example. The Wiener filter information is information in relation to the Wiener filter, and may include the Wiener filter flag and the Wiener filter index, for example.

FIG. 15 illustrates an example of an image decoding method according to the present invention schematically. The method described in FIG. 15 may be performed by a decoding apparatus.

Referring to FIG. 15, the decoding apparatus obtains prediction related information, residual information and Wiener filter information from the bit stream received from the encoding apparatus (step, S1500). The decoding apparatus may entropy-decode the bit stream and obtain the prediction related information, the residual information and the Wiener filter information.

The prediction related information may include prediction mode information and partitioning mode information of the current block. The residual information is information of the residual samples, and may include transform coefficients in a frequency domain for the residual samples, for example. The Wiener filter information is information in relation to the Wiener filter, and may include the Wiener filter flag and the Wiener filter index, for example. The Wiener filter index may be omitted in some cases.

The decoding apparatus generates prediction samples for a current block (step, S1510).

Here, the current block may be a coding block or a prediction block. In the case that the current block is a coding block, according to partitioning mode, the coding block may include one or a plurality of prediction blocks. The decoding apparatus may derive an MV based on a merge index or mvp index for each of the one or a plurality of prediction blocks, find a reference block on a reference picture reconstructed based on the derived MV for each of the prediction blocks, and derive a prediction sample of the corresponding prediction block based on a reconstructed sample in the reference block. The decoding apparatus may collect the prediction samples generated in a unit of prediction block and derive the prediction samples for the coding block.

Alternatively, in the case that the current block is a prediction block, the decoding apparatus may derive an optimal MV through the merge index or the mvp index for the corresponding prediction block, find a reference block on a reference picture reconstructed based on the derived MV for the corresponding prediction block, and derive a prediction sample of the corresponding prediction block based on a reconstructed sample in the reference block.

For example, in the case that the prediction mode for the prediction block is a skip mode or a merge mode, the decoding apparatus may derive an MV for the current block based on the merge candidate list configured according to a predetermined method and the merge index obtained from the bit stream, and generate the prediction samples in the prediction block based on the MV.

The decoding apparatus determines whether the Wiener filter is available for the current block (step, S1520).

The decoding apparatus may receive a Wiener filter flag explicitly through the bit stream, and determine whether the Wiener filter is available for the current block based on the Wiener filter flag.

In addition, the decoding apparatus may determine whether the Wiener filter is not available implicitly in at least one case of the case that a prediction mode for the current block is a skip mode or the case that a partitioning mode is 2N×2N. In this case, the decoding apparatus may not receive or parse the Wiener filter flag from the bit stream. In this case, the decoding apparatus may estimate or determine a value of the Wiener filter flag to be 0.

Furthermore, in the case that the current block is a prediction block, the prediction block is partitioned based on a partitioning mode of N×N from a coding block, and the prediction block is a prediction block of which partIdx is 3 with partitioning mode N×N in the coding block, the decoding apparatus may determine that the Wiener filter is not available. In this case, the decoding apparatus may not receive or parse the Wiener filter flag from the bit stream. In this case, the decoding apparatus may estimate or determine a value of the Wiener filter flag to be 0.

In the case that Wiener filter is available, the decoding apparatus generates a Wiener filter candidate list based on spatial neighboring blocks of the current block, and derives the Wiener filter coefficients for the current block based on a candidate block in the Wiener filter candidate list (step, S1530).

The encoding apparatus may further generate the Wiener filter candidate list based on a temporal corresponding block. The Wiener filter candidate list may include Wiener filter candidates represented in Table 1 and Table 2 described above.

The decoding apparatus may obtain a Wiener filter index from the bit stream, and select a candidate block among the Wiener filter candidate list based on the Wiener filter index.

Meanwhile, in the case that the current block is a prediction block and the prediction mode for the current block is a skip mode or a merge mode, the decoding apparatus may select a candidate block of the index indicated by the merge index among the Wiener filter candidate list, and derive the Wiener filter coefficients for the selected candidate block as the Wiener filter coefficients for the current block.

The Wiener filter coefficients for the selected candidate block may be derived based on the relation between the candidate block and the reference block of the candidate block. Particularly, a method for deriving the Wiener filter coefficients for each of the spatial neighboring blocks or the temporal corresponding block is as described in the description for FIG. 5.

Here, as an example, the temporal corresponding block may be a bottom-right neighboring block or a center bottom-right block of the collocated block located on the collocated picture which is one of the reference pictures.

As another example, the temporal corresponding block may be a block located on a position of arithmetic left shifted after being arithmetic left shifted by n to x axis and y axis from a bottom-right neighboring block or a center bottom-right block of the collocated block located on the collocated picture which is one of the reference pictures. That is, the temporal corresponding block may be a block that covers $((x_0>>n)<<n, (y_0>>n)<<n)$ sample position, when a top-left sample position of the bottom-right neighboring block or the center bottom-right block is $(x_0, y_0)$. Here, n is a positive integer, and may be one of 2, 3, 4, 5 or 6, and the like.

As another example, the temporal corresponding block may be a coding block (CB) or a coding tree block (CTB) including a bottom-right neighboring block or a center bottom-right block of the collocated block located on the collocated picture which is one of the reference pictures.

As another example, the temporal corresponding block may be a CTB row or a CTB column including a bottom-right neighboring block or a center bottom-right block of the collocated block located on the collocated picture which is one of the reference pictures.

As another example, the temporal corresponding block may correspond to an area having a motion vector of the same phase as the motion vector phase of a bottom-right neighboring block or a center bottom-right block of the collocated block located on the collocated picture which is one of the reference pictures.

As another example, the temporal corresponding block may be an area including a bottom-right neighboring block or a center bottom-right block of the collocated block located on the collocated picture which is one of the reference pictures, and the area may be an area of the collocated picture or a slice in the collocated picture partitioned by a predetermined size and a number. In this case, the width and/or the height of the area may be a multiple of CTB.

Meanwhile, in the case that the current block is a prediction block, the prediction block is partitioned based on a partitioning mode of N×N from a coding block, and the prediction block is a prediction block of which partIdx is 3 with partitioning mode N×N in the coding block, the Wiener filter candidate list may be generated based on the prediction blocks of which partIdx is 0 to 2 located in the coding block among the spatial neighboring blocks, the Wiener filter index obtained from the bit stream may indicate one of the prediction blocks of which partIdx is 0 to 2 located in the coding block, and the decoding apparatus may select one of the prediction blocks of which partIdx is 0 to 2 located in the coding block. In this case, the Wiener filter coefficients for the selected prediction block may be the same as the Wiener filter coefficients which are selected for filtering the selected prediction block.

Alternatively, in the case that the current block is a prediction block and the prediction mode for the current block is a skip mode or a merge mode, among the Wiener filter candidate list, the candidate block of the index indicated by the merge index may be selected, and the Wiener filter coefficients for the selected candidate block may be derived as the Wiener filter coefficients for the current block.

The decoding apparatus performs filtering of the prediction samples based on the derived Wiener filter coefficients (step, S1540). The decoding apparatus may generate prediction samples more similar to an original sample through the filtering, and through this, may reduce the amount of data for residual samples.

The decoding apparatus generates a reconstructed picture based on the filtered prediction samples and residual samples (step, S1550). The decoding apparatus may derive the residual samples for the current block based on the obtained residual information, and generate reconstructed samples by adding the filtered prediction samples for the current block and the residual samples. The decoding apparatus may generate the reconstructed picture based on the reconstructed samples.

According to the present invention, Wiener filter coefficients for a current block may be efficiently derived with using little additional information. In addition, according to the present invention, prediction efficiency may be improved through filtering for prediction samples based on Wiener filter coefficients, and amount of data for residual signal transmission may be reduced, thereby increasing overall coding efficiency.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A method for decoding an image performed by a decoding apparatus, comprising:
    obtaining prediction related information and residual information from a received bit stream;
    generating prediction samples by performing an inter-prediction based on the prediction related information for a current block;
    determining whether a Wiener filter is available for the current block;
    generating a Wiener filter candidate list based on spatial neighboring blocks of the current block when the Wiener filter is available, and deriving Wiener filter coefficients for the current block based on a candidate block in the Wiener filter candidate list;
    filtering the prediction samples based on the derived Wiener filter coefficients;
    deriving residual samples for the current block based on the residual information; and
    generating a reconstructed picture based on the filtered prediction samples and the residual samples,
    wherein the Wiener filter candidate list is further derived based on a temporal corresponding block of the current block, and
    wherein the temporal corresponding block is derived based on a bottom-right neighboring block or a center bottom-right block of a collocated block located on a collocated picture which is one of reference picture.

2. The method for decoding of claim 1, further comprising obtaining a Wiener filter index from the bit stream,
    wherein the candidate block indicated by the Wiener filter index is selected among the Wiener filter candidate list, and Wiener filter coefficients for the selected candidate block are derived as Wiener filter coefficients for the current block.

3. The method for decoding of claim 2, wherein the Wiener filter coefficients for the selected candidate block are derived based on a relation between the candidate block and a reference block of the candidate block.

4. The method for decoding of claim 1, further comprising a Wiener filter index from the bit stream,
    wherein the Wiener filter is determined to be available when a value of the Wiener filter flag is 1, and
    wherein the Wiener filter is determined to be not available when a value of the Wiener filter flag is 0.

5. The method for decoding of claim 1, wherein the current block is a coding block,
    wherein the prediction related information includes prediction mode information and partitioning mode information for the current block, and
    wherein the Wiener filter is determined to be not available in at least one case of a case that a prediction mode of the current block is a skip mode or a case that a partitioning mode of the current block is 2N×2N.

6. The method for decoding of claim 5, wherein a Wiener filter flag and a Wiener filter index are not obtained from the bit stream and a value of the Wiener filter flag is estimated to 0 in at least one case of a case that a prediction mode of the current block is a skip mode or a case that a partitioning mode of the current block is 2N×2N.

7. The method for decoding of claim 1, when the current block is a prediction block,
    when the prediction related information includes partitioning mode information of the current block, the current block is partitioned based on partitioning mode N×N from a coding block, and
    when the current block is a prediction block is a prediction block of which partIdx is 3 with partitioning mode N×N in the coding block, it is determined that the Wiener filter is not available.

8. The method for decoding of claim 1, further comprising a Wiener filter index from the bit stream,
    when the current block is a prediction block,
    when the prediction related information includes partitioning mode information of the current block, the current block is partitioned based on partitioning mode N×N from a coding block, and
    when the current block is a prediction block is a prediction block of which partIdx is 3 with partitioning mode N×N in the coding block, the Wiener filter index indicates one of prediction blocks of which partIdx is 0 to 2 located in the coding block.

9. The method for decoding of claim 8, wherein the candidate block indicated by the Wiener filter index is selected among the Wiener filter candidate list derived based on the prediction blocks of which partIdx is 0 to 2 located in the coding block, and
    wherein the Wiener filter coefficients for the selected candidate block are the same as Wiener filter coefficients selected for filtering for the selected candidate block.

10. The method for decoding of claim 1,
    wherein the temporal corresponding block is the bottom-right neighboring block or the center bottom-right block of the collocated block.

11. The method for decoding of claim 1, wherein the temporal corresponding block is a block located on a position of arithmetic left shifted by n to x axis and y axis from the bottom-right neighboring block or the center bottom-right block of the collocated block.

12. The method for decoding of claim 1,
    wherein the temporal corresponding block is a coding block (CB) or a coding tree block (CTB) including the bottom-right neighboring block or the center bottom-right block of the collocated block.

13. The method for decoding of claim 1,
    wherein the temporal corresponding block corresponds to an area having a motion vector of a same phase as a motion vector phase of the bottom-right neighboring block or the center bottom-right block of the collocated block.

14. The method for decoding of claim 1, when the current block is a prediction block,
   when the prediction related information includes partitioning mode information and a merge index of the current block, and
   when a prediction mode of the current block is a skip mode or a merge mode, generating the prediction samples includes:
   deriving a motion vector (MV) for the current block based on the merge index; and
   generating the prediction samples in the current block based on the motion vector,
   wherein the candidate block of an index indicated by the merge index is selected among the Wiener filter candidate list, and Wiener filter coefficients for the selected candidate block are derived as Wiener filter coefficients for the current block.

15. A method for encoding an image performed by a decoding apparatus, comprising:
   generating prediction samples for a current block based on an inter-prediction;
   determining whether a Wiener filter is available for the current block;
   generating a Wiener filter candidate list based on spatial neighboring blocks of the current block when the Wiener filter is available, and deriving Wiener filter coefficients for the current block based on a candidate block in the Wiener filter candidate list;
   filtering the prediction samples based on the derived Wiener filter coefficients;
   deriving residual samples for the current block based on original samples and the filtered prediction samples; and
   outputting by encoding prediction related information of the current block, residual information of the residual samples and Wiener filter information,
   wherein the Wiener filter candidate list is further derived based on a temporal corresponding block of the current block, and
   wherein the temporal corresponding block is derived based on a bottom-right neighboring block or a center bottom-right block of a collocated block located on a collocated picture which is one of reference picture.

* * * * *